US008514210B2

(12) United States Patent
Roberts et al.

(10) Patent No.: US 8,514,210 B2
(45) Date of Patent: Aug. 20, 2013

(54) SYSTEMS AND METHODS FOR CALIBRATING SOLID STATE LIGHTING PANELS USING COMBINED LIGHT OUTPUT MEASUREMENTS

(75) Inventors: John K. Roberts, Ellicott City, MD (US); Chenhua You, Cupertino, CA (US); Clinton Vllcans, Raleigh, NC (US)

(73) Assignee: Cree, Inc., Durham, NC (US)

( * ) Notice: Subject to any disclaimer, the term of this patent is extended or adjusted under 35 U.S.C. 154(b) by 1076 days.

(21) Appl. No.: 11/751,364

(22) Filed: May 21, 2007

(65) Prior Publication Data

US 2007/0216704 A1 Sep. 20, 2007

Related U.S. Application Data

(63) Continuation-in-part of application No. 11/368,976, filed on Mar. 6, 2006, now Pat. No. 7,926,300, and a continuation-in-part of application No. 11/601,410, filed on Nov. 17, 2006, now Pat. No. 8,278,846.

(60) Provisional application No. 60/738,305, filed on Nov. 18, 2005.

(51) Int. Cl.

*G06F 3/038* (2006.01)
*F21V 1/00* (2006.01)
*G05F 1/00* (2006.01)

(52) U.S. Cl.

USPC .............. 345/207; 345/77; 362/239; 315/308

(58) Field of Classification Search

None

See application file for complete search history.

(56) References Cited

U.S. PATENT DOCUMENTS

| | | | |
|---|---|---|---|
| 3,927,290 | A | 12/1975 | Denley |
| 4,329,625 | A | 5/1982 | Nishizawa et al. |
| 5,150,016 | A | 9/1992 | Sawase et al. |
| 5,264,997 | A | 11/1993 | Hutchisson et al. |

(Continued)

FOREIGN PATENT DOCUMENTS

| | | |
|---|---|---|
| EP | 1 081 771 A2 | 3/2001 |
| EP | 1152 642 | 4/2001 |

(Continued)

OTHER PUBLICATIONS

U.S. Appl. No. 60/990,724, filed Nov. 28, 2007.

(Continued)

*Primary Examiner* — Amr Awad
*Assistant Examiner* — Andre Matthews
(74) *Attorney, Agent, or Firm* — Myers Bigel Sibley & Sajovec, PA

(57) ABSTRACT

A method of calibrating a lighting panel including a plurality of segments, a respective segment configured to emit a first color light and a second color light in response to pulse width modulation control signals having respective duty cycles, includes activating the plurality of segments to simultaneously emit the first and second colors of light. A combined light output for the plurality of segments is measured at a measurement location to obtain aggregate emission data. Separate emission data for the first and second colors of light is determined based on the aggregate emission data. For example, the separate emission data for the first and second colors of light may be derived based on extrapolation of the aggregate emission data and expected emission data for the first and second colors of light. Related calibration systems are also discussed.

9 Claims, 14 Drawing Sheets

(56) References Cited

U.S. PATENT DOCUMENTS

| | | | | |
|---|---|---|---|---|
| 5,673,059 | A | 9/1997 | Zavracky et al. | |
| 5,783,909 | A | 7/1998 | Hochstein | |
| 5,959,316 | A | 9/1999 | Lowery | |
| 6,078,148 | A | 6/2000 | Hochstein | |
| 6,095,666 | A | 8/2000 | Salam | |
| 6,127,784 | A | 10/2000 | Grossman et al. | |
| 6,153,985 | A | 11/2000 | Grossman | |
| 6,236,331 | B1 | 5/2001 | Dussureault | |
| 6,285,139 | B1 | 9/2001 | Ghanem | |
| 6,292,901 | B1 | 9/2001 | Lys et al. | |
| 6,335,538 | B1 | 1/2002 | Prutchi et al. | |
| 6,350,041 | B1 | 2/2002 | Tarsa et al. | |
| 6,357,889 | B1 | 3/2002 | Duggal et al. | |
| 6,362,578 | B1 | 3/2002 | Swanson et al. | |
| 6,411,046 | B1 | 6/2002 | Muthu | |
| 6,441,558 | B1 | 8/2002 | Muthu et al. | |
| 6,495,964 | B1 | 12/2002 | Muthu et al. | |
| 6,498,440 | B2 | 12/2002 | Stam et al. | |
| 6,510,995 | B2 | 1/2003 | Muthu et al. | |
| 6,576,881 | B2 | 6/2003 | Muthu et al. | |
| 6,576,930 | B2 | 6/2003 | Reeh et al. | |
| 6,608,614 | B1 | 8/2003 | Johnson | |
| 6,624,350 | B2 | 9/2003 | Nixon et al. | |
| 6,630,801 | B2 | 10/2003 | Schuurmans | |
| 6,633,301 | B1 | 10/2003 | Dallas et al. | |
| 6,674,060 | B2 | 1/2004 | Antila | |
| 6,700,692 | B2 | 3/2004 | Tonar et al. | |
| 6,741,351 | B2 | 5/2004 | Marshall et al. | |
| 6,809,347 | B2 | 10/2004 | Tasch et al. | |
| 6,836,081 | B2 | 12/2004 | Swanson et al. | |
| 6,841,804 | B1 | 1/2005 | Chen et al. | |
| 6,841,947 | B2 | 1/2005 | Berg-johansen | |
| 6,851,834 | B2 | 2/2005 | Leysath | |
| 6,936,857 | B2 | 8/2005 | Doxsee et al. | |
| 6,964,507 | B2 | 11/2005 | Mohacsi | |
| 7,009,343 | B2 | 3/2006 | Lim et al. | |
| 7,023,543 | B2 | 4/2006 | Cunningham | |
| 7,093,958 | B2 | 8/2006 | Coushaine | |
| 7,135,664 | B2 | 11/2006 | Vornsand et al. | |
| 7,140,752 | B2 | 11/2006 | Ashdown | |
| 7,173,384 | B2 | 2/2007 | Plotz et al. | |
| 7,186,000 | B2 | 3/2007 | Lebens et al. | |
| 7,202,608 | B2 | 4/2007 | Robinson et al. | |
| 7,208,713 | B2 | 4/2007 | Ishiguchi | |
| 7,213,940 | B1 | 5/2007 | Van De Ven et al. | |
| 7,256,557 | B2 * | 8/2007 | Lim et al. | 315/312 |
| 7,262,558 | B2 | 8/2007 | Hsu | |
| 7,315,139 | B1 | 1/2008 | Selvan et al. | |
| 7,339,323 | B2 | 3/2008 | Bucur | |
| 7,478,922 | B2 | 1/2009 | Garbus, Jr. | |
| 7,518,319 | B2 | 4/2009 | Konno et al. | |
| 7,521,879 | B2 | 4/2009 | Hong et al. | |
| 7,554,129 | B2 | 6/2009 | Roth et al. | |
| 7,586,271 | B2 | 9/2009 | Shuy | |
| 7,595,786 | B2 | 9/2009 | Shih | |
| 7,614,759 | B2 | 11/2009 | Negley | |
| 7,712,917 | B2 | 5/2010 | Roberts et al. | |
| 7,714,824 | B2 * | 5/2010 | Roth | 345/88 |
| 7,777,166 | B2 | 8/2010 | Roberts | |
| 7,804,478 | B2 | 9/2010 | Schou | |
| 7,872,430 | B2 | 1/2011 | Roberts et al. | |
| 2001/0035853 | A1 | 11/2001 | Hoelen et al. | |
| 2002/0070914 | A1 | 6/2002 | Bruning et al. | |
| 2002/0190972 | A1 | 12/2002 | Ven de Van | |
| 2003/0011832 | A1 * | 1/2003 | Chang | 358/518 |
| 2003/0089918 | A1 | 5/2003 | Hiller et al. | |
| 2003/0230991 | A1 | 12/2003 | Muthu et al. | |
| 2005/0062446 | A1 | 3/2005 | Ashdown | |
| 2005/0099478 | A1 | 5/2005 | Iwase | |
| 2005/0259439 | A1 | 11/2005 | Cull et al. | |
| 2006/0049781 | A1 | 3/2006 | Lee et al. | |
| 2006/0105482 | A1 | 5/2006 | Alferink | |
| 2006/0214174 | A1 | 9/2006 | Shirakuma et al. | |
| 2006/0226795 | A1 | 10/2006 | Walter et al. | |
| 2006/0256049 | A1 | 11/2006 | Schou | |
| 2007/0040512 | A1 | 2/2007 | Jungwirth et al. | |
| 2007/0052375 | A1 * | 3/2007 | Lin et al. | 315/312 |
| 2007/0115228 | A1 | 5/2007 | Roberts | |
| 2007/0115662 | A1 | 5/2007 | Roberts | |
| 2007/0115670 | A1 | 5/2007 | Roberts | |
| 2007/0115671 | A1 | 5/2007 | Roberts | |
| 2007/0139920 | A1 | 6/2007 | Van De Ven et al. | |
| 2007/0139923 | A1 | 6/2007 | Negley et al. | |
| 2007/0170447 | A1 | 7/2007 | Negley et al. | |
| 2007/0171145 | A1 | 7/2007 | Coleman et al. | |
| 2007/0216704 | A1 | 9/2007 | Roberts | |
| 2007/0247414 | A1 | 10/2007 | Roberts | |
| 2007/0263393 | A1 | 11/2007 | Van De Ven | |
| 2007/0267983 | A1 | 11/2007 | Van De Ven et al. | |
| 2007/0274063 | A1 | 11/2007 | Negley | |
| 2007/0274080 | A1 | 11/2007 | Negley et al. | |
| 2007/0278503 | A1 | 12/2007 | Van De Ven et al. | |
| 2007/0278934 | A1 | 12/2007 | Van De Ven et al. | |
| 2007/0278974 | A1 | 12/2007 | Van De Ven | |
| 2007/0279440 | A1 | 12/2007 | Negley | |
| 2007/0279903 | A1 | 12/2007 | Negley et al. | |
| 2007/0280624 | A1 | 12/2007 | Negley et al. | |
| 2008/0084685 | A1 | 4/2008 | Van De Ven et al. | |
| 2008/0084700 | A1 | 4/2008 | Van De Ven | |
| 2008/0084701 | A1 | 4/2008 | Van De Ven et al. | |
| 2008/0088248 | A1 | 4/2008 | Myers | |
| 2008/0089053 | A1 | 4/2008 | Negley | |
| 2008/0106895 | A1 | 5/2008 | Van de Ven et al. | |
| 2008/0106907 | A1 | 5/2008 | Trott et al. | |
| 2008/0112168 | A1 | 5/2008 | Pickard et al. | |
| 2008/0112170 | A1 | 5/2008 | Trott et al. | |
| 2008/0112183 | A1 | 5/2008 | Negley | |
| 2008/0130285 | A1 | 6/2008 | Negley et al. | |
| 2008/0136313 | A1 | 6/2008 | Van De Ven et al. | |
| 2008/0137347 | A1 | 6/2008 | Trott et al. | |
| 2008/0191643 | A1 | 8/2008 | Roberts | |
| 2008/0278950 | A1 | 11/2008 | Pickard et al. | |
| 2008/0278952 | A1 | 11/2008 | Trott et al. | |
| 2008/0278957 | A1 | 11/2008 | Pickard et al. | |
| 2008/0291669 | A1 | 11/2008 | Roberts | |
| 2008/0304261 | A1 | 12/2008 | Van De Ven et al. | |
| 2008/0304269 | A1 | 12/2008 | Pickard et al. | |
| 2008/0309255 | A1 | 12/2008 | Myers et al. | |
| 2009/0033612 | A1 | 2/2009 | Roberts | |
| 2009/0040674 | A1 | 2/2009 | Roberts | |
| 2009/0108269 | A1 | 4/2009 | Negley et al. | |
| 2009/0153450 | A1 | 6/2009 | Roberts | |
| 2009/0160363 | A1 | 6/2009 | Negley et al. | |
| 2009/0184616 | A1 | 7/2009 | Van De Ven et al. | |
| 2009/0184666 | A1 | 7/2009 | Myers et al. | |

FOREIGN PATENT DOCUMENTS

| | | | |
|---|---|---|---|
| EP | 1 111 966 | | 6/2001 |
| EP | 1152642 | A2 | 11/2001 |
| EP | 1 548 573 | | 12/2003 |
| EP | 1 589 519 | | 4/2005 |
| EP | 1548573 | A1 | 6/2005 |
| EP | 1589519 | A2 | 10/2005 |
| FR | 2 854 252 | | 4/2003 |
| FR | 2854252 | | 10/2004 |
| JP | 2-75197 | | 3/1990 |
| JP | 2004/286971 | | 10/2004 |
| JP | 2004286971 | | 10/2004 |
| JP | 2005-302737 | | 10/2005 |
| JP | 2006-147171 | A | 6/2006 |
| JP | 2007-080882 | A | 3/2007 |
| JP | 2008-538053 | A | 10/2008 |
| WO | WO 98/43014 | | 10/1998 |
| WO | WO 00/34709 | | 6/2000 |
| WO | WO 2005/021323 | A2 | 3/2005 |
| WO | WO 2005/021323 | A3 | 3/2005 |
| WO | WO 2006/110340 | A1 | 10/2006 |
| WO | WO 2007/061758 | A1 | 5/2007 |

OTHER PUBLICATIONS

U.S. Appl. No. 61/041,404, filed Apr. 1, 2008.

U.S. Appl. No. 61/108,133, filed Oct. 24, 2008.

Perduijn et al., "Light Output Feedback Solution for RGB LED Backlight Applications", 22 pages, SID Digest (2000).
Narendran et al., "Solid-State Lighting: Failure Analysis of White LED's", Journal of Crystal Growth, vol. 268:3-4 (Aug. 2004).
Zhu et al., "Optimizing the Performance of Remote Phosphor LED", First International Conference on White LED's and Solid State Lighting, PW-48 (Nov. 26-30, 2007).
European Search Report (8 pages) corresponding to European Application No. 06845870.2; Dated: Nov. 6, 2008.
International Search Report and Written Opinion (9 pages) corresponding to International Application No. PCT/US07/12707; Mailing Date: Aug. 21, 2008.
International Search Report and Written Opinion (12 pages) corresponding to International Application No. PCT/US06/48521; Mailing Date: Feb. 7, 2008.
U.S. Appl. No. 60/749,133, filed Dec. 9, 2005, Roberts.
"Invitation to Pay Additional Fees" for corresponding International Application No. PCT/US2006/044511, mailed May 7, 2007.
Notification of Transmittal of the International Search Report and the Written Opinion of the International Searching Authority, or the Declaration corresponding to PCT/US2006/044511 mailed Nov. 9, 2007.
International Search Report and Written Opinion (12 pages) corresponding to International Application No. PCT/US2008/005827; Mailing Date: Nov. 21, 2008.
Official Action corresponding to Japanese Patent Application No. 2008-541343 dated Dec. 14, 2010; 8 pages.
Notice of Allowance corresponding to U.S. Appl. No. 11/601,410 dated Feb. 13, 2012; 2 pages.
Japanese Office Action Corresponding to Japanese Patent Application No. 2010-509334; Mailing Date: Mar. 30, 2012; Foreign Text, 2 pages, English Translation Thereof, 3 pages.

* cited by examiner

SYSTEMS AND METHODS FOR CALIBRATING SOLID STATE LIGHTING PANELS USING COMBINED LIGHT OUTPUT MEASUREMENTS

CROSS-REFERENCE TO RELATED APPLICATIONS

The present application claims priority to U.S. Provisional Patent Application No. 60/738,305, filed Nov. 18, 2005, entitled System and Method for Interconnection and Integration of LED Backlighting Modules, the disclosure of which is hereby incorporated herein by reference in its entirety. The present application is a continuation in part of U.S. patent application Ser. No. 11/368,976, filed Mar. 6, 2006, entitled Adaptive Adjustment of Light Output of Solid State Lighting Panels, and also claims priority from U.S. patent application Ser. No. 11/601,410; Filed Nov. 17, 2006, entitled Systems And Methods For Calibrating Solid State Lighting Panels, the disclosures of which are hereby incorporated by reference herein in their entireties.

FIELD OF THE INVENTION

The present invention relates to solid state lighting, and more particularly to adjustable solid state lighting panels and to systems and methods for adjusting the light output of solid state lighting panels.

BACKGROUND

Solid state lighting arrays are used for a number of lighting applications. For example, solid state lighting panels including arrays of solid state lighting devices have been used as direct illumination sources, such as in architectural and/or accent lighting. A solid state lighting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid state light emitting device. Typically, a solid state light emitting device generates light through the recombination of electronic carriers, i.e. electrons and holes, in a light emitting layer or region.

Solid state lighting panels are commonly used as backlights for small liquid crystal display (LCD) display screens, such as LCD display screens used in portable electronic devices. In addition, there has been increased interest in the use of solid state lighting panels as backlights for larger displays, such as LCD television displays.

For smaller LCD screens, backlight assemblies typically employ white LED lighting devices that include a blue-emitting LED coated with a wavelength conversion phosphor that converts some of the blue light emitted by the LED into yellow light. The resulting light, which is a combination of blue light and yellow light, may appear white to an observer. However, while light generated by such an arrangement may appear white, objects illuminated by such light may not appear to have a natural coloring, because of the limited spectrum of the light. For example, because the light may have little energy in the red portion of the visible spectrum, red colors in an object may not be illuminated well by such light. As a result, the object may appear to have an unnatural coloring when viewed under such a light source.

The color rendering index of a light source is an objective measure of the ability of the light generated by the source to accurately illuminate a broad range of colors. The color rendering index ranges from essentially zero for monochromatic sources to nearly 100 for incandescent sources. Light generated from a phosphor-based solid state light source may have a relatively low color rendering index.

For large-scale backlight and illumination applications, it is often desirable to provide a lighting source that generates a white light having a high color rendering index, so that objects and/or display screens illuminated by the lighting panel may appear more natural. Accordingly, such lighting sources may typically include an array of solid state lighting devices including red, green and blue light emitting devices. When red, green and blue light emitting devices are energized simultaneously, the resulting combined light may appear white, or nearly white, depending on the relative intensities of the red, green and blue sources. There are many different hues of light that may be considered "white." For example, some "white" light, such as light generated by sodium vapor lighting devices, may appear yellowish in color, while other "white" light, such as light generated by some fluorescent lighting devices, may appear more bluish in color.

The chromaticity of a particular light source may be referred to as the "color point" of the source. For a white light source, the chromaticity may be referred to as the "white point" of the source. The white point of a white light source may fall along a locus of chromaticity points corresponding to the color of light emitted by a black-body radiator heated to a given temperature. Accordingly, a white point may be identified by a correlated color temperature (CCT) of the light source, which is the temperature at which the heated black-body radiator matches the hue of the light source. White light typically has a CCT of between about 4000K and 8000K. White light with a CCT of 4000K has a yellowish color, while light with a CCT of 8000K is more bluish in color.

For larger display and/or illumination applications, multiple solid state lighting tiles may be connected together, for example, in a two dimensional array, to form a larger lighting panel. Unfortunately, however, the hue of white light generated may vary from tile to tile, and/or even from lighting device to lighting device. Such variations may result from a number of factors, including variations of intensity of emission from different LEDs, and/or variations in placement of LEDs in a lighting device and/or on a tile. Accordingly, in order to construct a multi-tile display panel that produces a consistent hue of white light from tile to tile, it may be desirable to measure the hue and saturation, or chromaticity, of light generated by a large number of tiles, and to select a subset of tiles having a relatively close chromaticity for use in the multi-tile display. This may result in decreased yields and/or increased inventory costs for a manufacturing process.

Moreover, even if a solid state display/lighting tile has a consistent, desired hue of light when it is first manufactured, the hue and/or brightness of solid state devices within the tile may vary non-uniformly over time and/or as a result of temperature variations, which may cause the overall color point of the panel to change over time and/or may result in non-uniformity of color across the panel. In addition, a user may wish to change the light output characteristics of a display panel in order to provide a desired hue and/or brightness level.

SUMMARY

Some embodiments of the invention provide methods of calibrating a lighting panel including a plurality of segments, a respective segment configured to emit a first color of light and a second color of light in response to pulse width modulation control signals having respective duty cycles. According to some embodiments of the present invention, the plurality of segments are activated to simultaneously emit the first and second colors of light, and a combined light output for the plurality of segments is measured at a measurement location to obtain aggregate emission data. Separate emission data for the first and second colors of light is determined based on the aggregate emission data.

In some embodiments, the separate emission data for the first and second colors of light may be derived based on extrapolation of the aggregate emission data and expected emission data for the first and second colors of light. For example, first and second local peak wavelengths may be determined in respective wavelength ranges corresponding to each of the first and second colors based on the aggregate emission data. Starting points for an extrapolation algorithm may be determined based on the first and second peak wavelength values, and separate spectral distributions may be calculated for each of the first and second colors of light using the extrapolation algorithm based on the respective starting points.

In other embodiments, each of the plurality of segments may be further configured to emit a third color of light in response to the pulse width modulation control signals. The plurality of segments may be activated to simultaneously emit the first, second, and third colors of light, and separate emission data for the first, second, and third colors of light may be determined based on the aggregate emission data. For example, the first color of light may be light in a red wavelength range, the second color of light may be light in a green wavelength range, and the third color of light may be light in a blue wavelength range.

In some embodiments, the duty cycle for emission of at least one of the first and second colors of light for at least one of the plurality of segments may be adjusted to reduce a luminance variation thereof based on the separate emission data.

In some embodiments, each segment of the plurality of segments may be a group of tiles. In other embodiments, each segment of the plurality of segments comprises a bar of tiles.

Other embodiments of the present invention provide methods of calibrating a lighting panel including a plurality of segments, a respective segment configured to emit red, green, and blue light in response to pulse width modulation control signals having respective duty cycles. According to other embodiments of the present invention, the plurality of segments are activated to simultaneously emit red, green, and blue light, and a combined red, green, and blue light output for the plurality of segments is measured at a measurement location to obtain aggregate emission data. Separate emission data for the red, green, and blue light is determined based on the aggregate emission data.

Further embodiments of the present invention provide calibration systems for calibrating a lighting panel including a plurality of segments, a respective segment configured to emit a first color of light and a second color of light in response to pulse width modulation control signals having respective duty cycles. According to further embodiments of the present invention, the calibration systems include a calibration controller configured to be coupled to the lighting panel, and a calibration unit coupled to the calibration controller and including a calorimeter. The calibration controller is configured to activate the plurality of segments to simultaneously emit the first and second colors of light. The calibration unit is configured to measure a combined light output from the plurality of segments at a measurement location to obtain aggregate emission data, and the calibration controller is configured to determine separate emission data for the first and second colors of light based on the aggregate emission data.

Other methods, systems, and/or devices according to some embodiments will become apparent to one with skill in the art upon review of the following drawings and detailed description. It is intended that all such additional methods, devices, and/or computer program products be included within this description, be within the scope of the invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
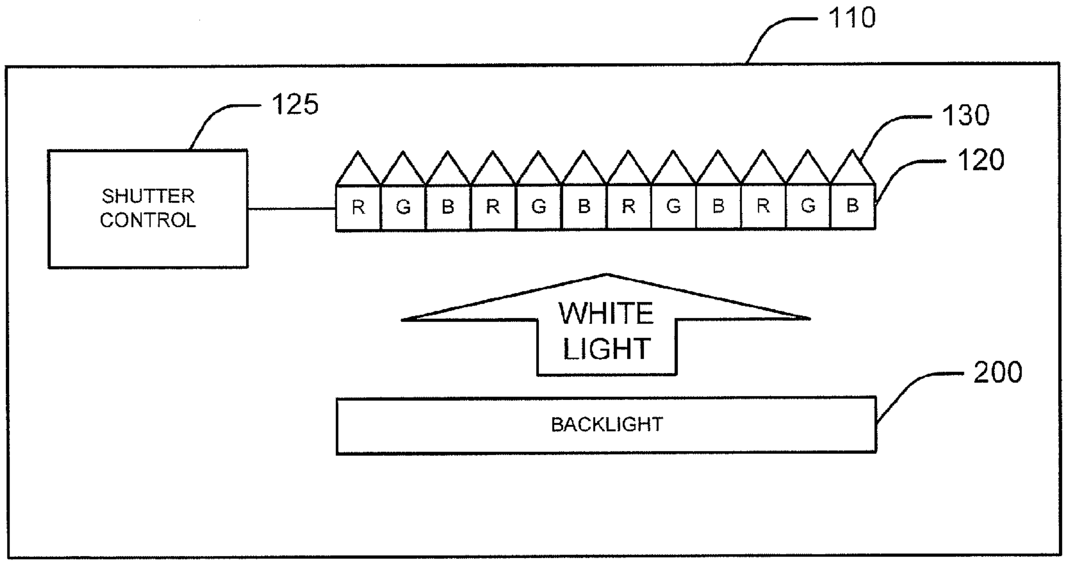
FIG. 1 is a schematic illustration of an LCD display.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to flowchart illustrations and/or block diagrams of methods, systems and computer program products according to embodiments of the invention. It will be understood that some blocks of the flowchart illustrations and/or block diagrams, and combinations of some blocks in the flowchart illustrations and/or block diagrams, can be implemented by computer program instructions. These computer program instructions may be stored or implemented in a microcontroller, microprocessor, digital signal processor (DSP), field programmable gate array (FPGA), a state machine, programmable logic controller (PLC) or other processing circuit, general purpose computer, special purpose computer, or other programmable data processing apparatus such as to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

A schematic diagram of an LCD display 110 including a solid state backlight unit 200 is shown in FIG. 1. As shown therein, white light generated by a solid state backlight unit 200 is transmitted through a matrix of red (R), green (G) and blue (B) color filters 120. Transmission of light through a particular color filter 120 is controlled by an individually addressable liquid crystal shutter 130 associated with the color filter 120. The operation of the liquid crystal shutters 130 is controlled by a shutter controller 125 in response to video data provided, for example, by a host computer, a television tuner, or other video source.

Many components of an LCD display have optical properties that are temperature-dependent. For example, optical properties of the liquid crystal shutters 130 and/or the color filters 120, such as transmissivity and/or frequency response, may shift with temperature. Also, the response properties of a photosensor in the backlight control system may shift with temperature. To compound the problem, shifts in the optical properties of elements of the display 110 that are outside the backlight unit 200 may not be detectable by a photosensor located within the backlight unit 200. For example, a photosensor located within the backlight unit 150 may be unable to detect color point shifts in the output of the display 110 that occur due to changes in the optical properties of the liquid crystal shutters 130 and/or the color filters 120. The larger the difference in the actual system temperature as compared to the calibration temperature, the larger the color point error may become.

In production, the color point of the display may be calibrated when the display 110 is in a warmed-up state (e.g. about 70° C.). However, because of the large thermal mass of a full sized display, it may take a relatively long period of time for an LCD display 110 to reach the fully warmed-up state after being switched on. During the warm-up period, the actual color point of the display may be different from the color point measured by a photosensor in the backlight control system. That is, although the backlight unit 200 may be calibrated and controlled to produce light having a particular color point, the actual color point of the light output by the display 110 may be shifted from the desired color point. The largest color point error may occur at initial power-up, and may decline progressively until the system is fully warmed up, which may take 1-2 hours.

Figure 2A:
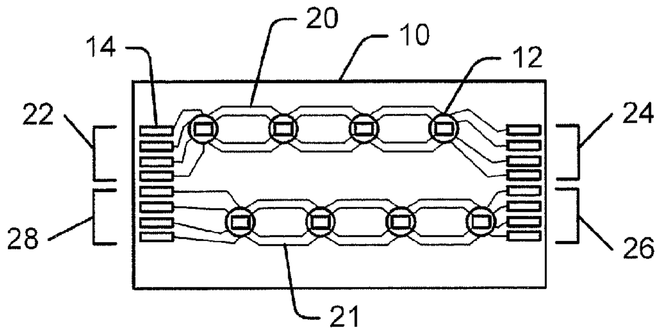
FIG. 2A is a front view of a solid state lighting tile in accordance with some embodiments of the invention.

A solid state backlight unit for an LCD display may include a plurality of solid state lighting elements. The solid state lighting elements may be arranged on one or more solid state lighting tiles that can be arranged to form a two-dimensional lighting panel, and may be mounted on a single board the size of a display or screen. Referring now to FIG. 2A, a solid state lighting tile 10 may include thereon a number of solid state lighting elements 12 arranged in a regular and/or irregular two dimensional array. The tile 10 may include, for example, a printed circuit board (PCB) on which one or more circuit elements may be mounted. In particular, a tile 10 may include a metal core PCB (MCPCB) including a metal core having thereon a polymer coating on which patterned metal traces (not shown) may be formed. MCPCB material, and material similar thereto, is commercially available from, for example, The Bergquist Company. The PCB may further include heavy clad (4 oz. copper or more) and/or conventional FR-4 PCB material with thermal vias. MCPCB material may provide improved thermal performance compared to conventional PCB material. However, MCPCB material may also be heavier than conventional PCB material, which may not include a metal core.

In the embodiments illustrated in FIG. 2A, the lighting elements 12 are multi-chip clusters of four solid state emitting devices per cluster. In the tile 10, four lighting elements 12 are serially arranged in a first path 20, while four lighting elements 12 are serially arranged in a second path 21. The lighting elements 12 of the first path 20 are connected, for example via printed circuits, to a set of four anode contacts 22 arranged at a first end of the tile 10, and a set of four cathode contacts 24 arranged at a second end of the tile 10. The lighting elements 12 of the second path 21 are connected to a set of four anode contacts 26 arranged at the second end of the tile 10, and a set of four cathode contacts 28 arranged at the first end of the tile 10.

Figure 2B:
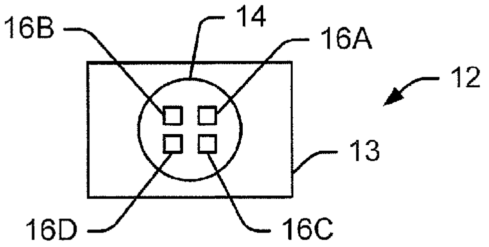
FIG. 2B is a front view of a solid state lighting element in accordance with some embodiments of the invention.
Figure 3:
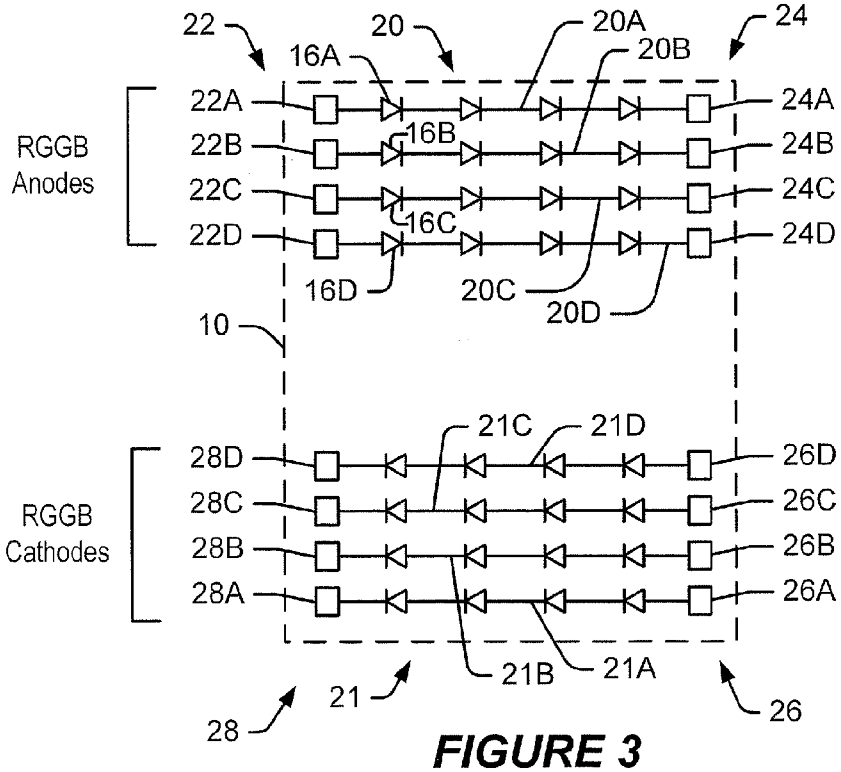
FIG. 3 is a schematic circuit diagram illustrating the electrical interconnection of LEDs in a solid state lighting tile in accordance with some embodiments of the invention.

Referring to FIGS. 2B and 3, the solid state lighting elements 12 may include, for example, organic and/or inorganic light emitting devices. A solid state lighting element 12 may include a packaged discrete electronic component including a carrier substrate on which a plurality of LED chips 16A-16D are mounted. In other embodiments, one or more solid state lighting elements 12 may include LED chips 16A-16D mounted directly onto electrical traces on the surface of the tile 10, forming a multi-chip module or chip-on-board assembly. Suitable tiles are disclosed in commonly assigned U.S. patent application Ser. No. 11/601,500 entitled “SOLID STATE BACKLIGHTING UNIT ASSEMBLY AND METHODS” filed Nov. 17, 2006, the disclosure of which is incorporated herein by reference.

The LED chips 16A-16D may include at least a red LED 16A, a green LED 16B and a blue LED 16C. The blue and/or green LEDs may be InGaN-based blue and/or green LED chips available from Cree, Inc., the assignee of the present invention. The red LEDs may be, for example, AlInGaP LED chips available from Epistar Corporation, Osram Opto Semiconductors GmbH, and others. The lighting device 12 may include an additional green LED 16D in order to make more green light available.

In some embodiments, the LEDs 16A-16D may have a square or rectangular periphery with an edge length of about 900 μm or greater (i.e. so-called “power chips.” However, in other embodiments, the LED chips 16A-16D may have an edge length of 500 μm or less (i.e. so-called “small chips”). In particular, small LED chips may operate with better electrical conversion efficiency than power chips. For example, green LED chips with a maximum edge dimension less than 500 μm and as small as 260 μm, commonly have a higher electrical conversion efficiency than 900 μm chips, and are known to typically produce 55 lumens of luminous flux per Watt of dissipated electrical power and as much as 90 lumens of luminous flux per Watt of dissipated electrical power.

The LEDs 16A-16D may be covered by an encapsulant, which may be clear and/or may include light scattering particles, phosphors, and/or other elements to achieve a desired emission pattern, color and/or intensity. A lighting device 12 may further include a reflector cup surrounding the LEDs 16A-16D, a lens mounted above the LEDs 16A-16D, one or more heat sinks for removing heat from the lighting device, an electrostatic discharge protection chip, and/or other elements.

LED chips 16A-16D of the lighting elements 12 in the tile 10 may be electrically interconnected as shown in the schematic circuit diagram in FIG. 3. As shown therein, the LEDs may be interconnected such that the blue LEDs 16A in the first path 20 are connected in series to form a string 20A. Likewise, the first green LEDs 16B in the first path 20 may be arranged in series to form a string 20B, while the second green LEDs 16D may be arranged in series to form a separate string 20D. The red LEDs 16C may be arranged in series to form a string 20C. Each string 20A-20D may be connected to an anode contact 22A-22D arranged at a first end of the tile 10 and a cathode contact 24A-24D arranged at the second end of the tile 10, respectively.

A string 20A-20D may include all, or less than all, of the corresponding LEDs in the first path 20 or the second path 21. For example, the string 20A may include all of the blue LEDs from all of the lighting elements 12 in the first path 20. Alternatively, a string 20A may include only a subset of the corresponding LEDs in the first path 20. Accordingly the first path 20 may include four serial strings 20A-20D arranged in parallel on the tile 10.

The second path 21 on the tile 10 may include four serial strings 21A, 21B, 21C, 21D arranged in parallel. The strings 21A to 21D are connected to anode contacts 26A to 26D, which are arranged at the second end of the tile 10 and to cathode contacts 28A to 28D, which are arranged at the first end of the tile 10, respectively.

It will be appreciated that, while the embodiments illustrated in FIGS. 2A, 2B, and 3 include four LED chips 16 per lighting device 12 which are electrically connected to form at least four strings of LEDs 16 per path 20, 21, more and/or fewer than four LED chips 16 may be provided per lighting device 12, and more and/or fewer than four LED strings may be provided per path 20, 21 on the tile 10. For example, a lighting device 12 may include only one green LED chip 16B, in which case the LEDs may be connected to form three strings per path 20, 21. Likewise, in some embodiments, the two green LED chips in a lighting device 12 may be connected in series to one another, in which case there may only be a single string of green LED chips per path 20, 22. Further, a tile 10 may include only a single path 20 instead of plural paths 20, 21 and/or more than two paths 20, 21 may be provided on a single tile 10.

Figure 4A:
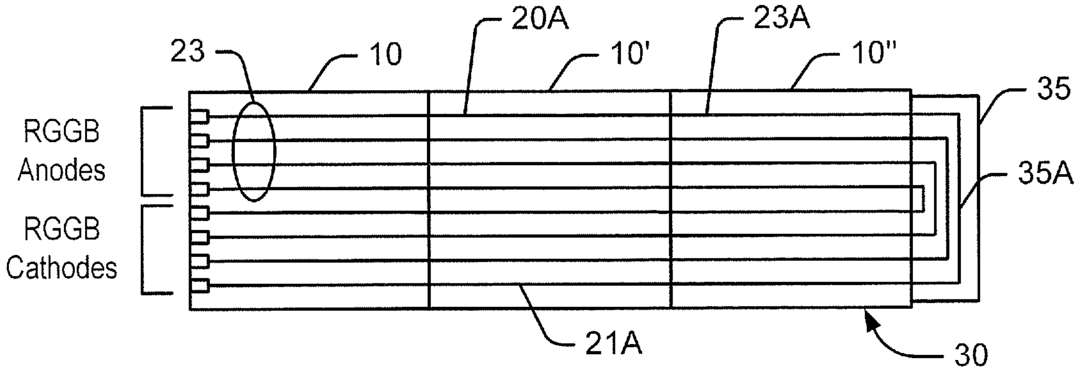
FIG. 4A is a front view of a bar assembly including multiple solid state lighting tiles in accordance with some embodiments of the invention.

Multiple tiles 10 may be assembled to form a larger lighting bar assembly 30 as illustrated in FIG. 4A. As shown therein, a bar assembly 30 may include two or more tiles 10, 10', 10'' connected end-to-end. Accordingly, referring to FIGS. 3 and 4A, the cathode contacts 24 of the first path 20 of the leftmost tile 10 may be electrically connected to the anode contacts 22 of the first path 20 of the central tile 10', and the cathode contacts 24 of the first path 20 of the central tile 10' may be electrically connected to the anode contacts 22 of the first path 20 of the rightmost tile 10", respectively. Similarly, the anode contacts 26 of the second path 21 of the leftmost tile 10 may be electrically connected to the cathode contacts 28 of the second path 21 of the central tile 10', and the anode contacts 26 of the second path 21 of the central tile 10' may be electrically connected to the cathode contacts 28 of the second path 21 of the rightmost tile 10", respectively.

Furthermore, the cathode contacts 24 of the first path 20 of the rightmost tile 10" may be electrically connected to the anode contacts 26 of the second path 21 of the rightmost tile 10" by a loopback connector 35. For example, the loopback connector 35 may electrically connect the cathode 24A of the string 20A of blue LED chips 16A of the first path 20 of the rightmost tile 10" with the anode 26A of the string 21A of blue LED chips of the second path 21 of the rightmost tile 10". In this manner, the string 20A of the first path 20 may be connected in series with the string 21A of the second path 21 by a conductor 35A of the loopback connector 35 to form a single string 23A of blue LED chips 16. The other strings of the paths 20, 21 of the tiles 10, 10', 10" may be connected in a similar manner.

The loopback connector 35 may include an edge connector, a flexible wiring board, or any other suitable connector. In addition, the loop connector may include printed traces formed on/in the tile 10.

While the bar assembly 30 shown in FIG. 4A is a one dimensional array of tiles 10, other configurations are possible. For example, the tiles 10 could be connected in a two-dimensional array in which the tiles 10 are all located in the same plane, or in a three dimensional configuration in which the tiles 10 are not all arranged in the same plane. Furthermore the tiles 10 need not be rectangular or square, but could, for example, be hexagonal, triangular, or the like.

Figure 4B:
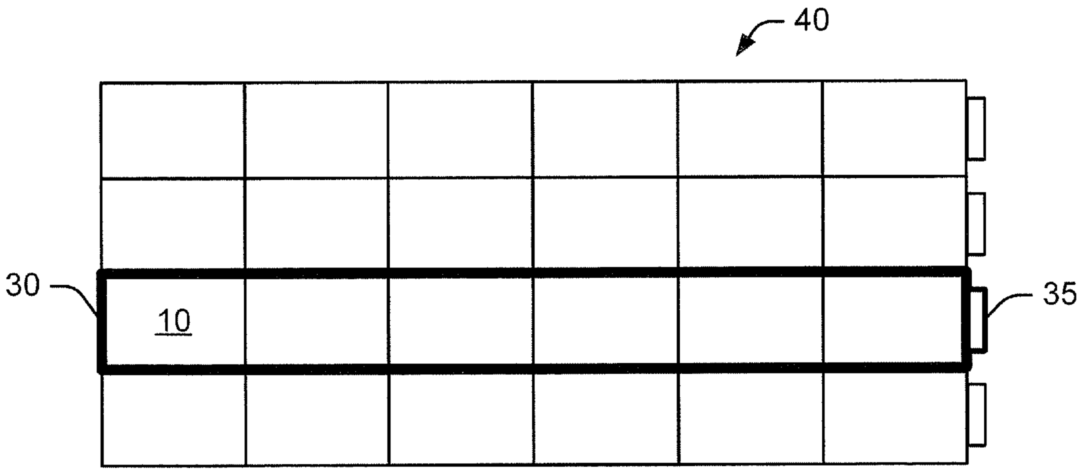
FIG. 4B is a front view of a lighting panel in accordance with some embodiments of the invention including multiple bar assemblies.

Referring to FIG. 4B, in some embodiments, a plurality of bar assemblies 30 may be combined to form a lighting panel 40, which may be used, for example, as a backlighting unit (BLU) for an LCD display. As shown in FIG. 4B, a lighting panel 40 may include four bar assemblies 30, each of which includes six tiles 10. The rightmost tile 10 of each bar assembly 30 includes a loopback connector 35. Accordingly, each bar assembly 30 may include four strings 23 of LEDs (i.e. one red, two green and one blue).

In some embodiments, a bar assembly 30 may include four LED strings 23 (one red, two green and one blue). Thus, a lighting panel 40 including nine bar assemblies may have 36 separate strings of LEDs. Moreover, in a bar assembly 30 including six tiles 10 with eight solid state lighting elements 12 each, an LED string 23 may include 48 LEDs connected in serial.

For some types of LEDs, in particular blue and/or green LEDs, the forward voltage (Vf) may vary by as much as +/−0.75V from a nominal value from chip to chip at a standard drive current of 20 mA. A typical blue or green LED may have a Vf of 3.2 Volts. Thus, the forward voltage of such chips may vary by as much as 25%. For a string of LEDs containing 48 LEDs, the total Vf required to operate the string at 20 mA may vary by as much as +/−36V.

Accordingly, depending on the particular characteristics of the LEDs in a bar assembly, a string of one light bar assembly (e.g., the blue string) may require significantly different operating power compared to a corresponding string of another bar assembly. These variations may significantly affect the color and/or brightness uniformity of a lighting panel that includes multiple tiles 10 and/or bar assemblies 30, as such Vf variations may lead to variations in brightness and/or hue from tile to tile and/or from bar to bar. For example, current differences from string to string may result in large differences in the flux, peak wavelength, and/or dominant wavelength output by a string. Variations in LED drive current on the order of 5% or more may result in unacceptable variations in light output from string to string and/or from tile to tile. Such variations may significantly affect the overall color gamut, or range of displayable colors, of a lighting panel.

In addition, the light output characteristics of LED chips may change during their operational lifetime. For example, the light output by an LED may change over time and/or with ambient temperature.

In order to provide consistent, controllable light output characteristics for a lighting panel, some embodiments of the invention provide a lighting panel having two or more serial strings of LED chips. An independent current control circuit is provided for each of the strings of LED chips. Furthermore, current to each of the strings may be individually controlled, for example, by means of pulse width modulation (PWM) and/or pulse frequency modulation (PFM). The width of pulses applied to a particular string in a PWM scheme (or the frequency of pulses in a PFM scheme) may be based on a pre-stored pulse width (frequency) value that may be modified during operation based, for example, on a user input and/or a sensor input.

Figure 5:
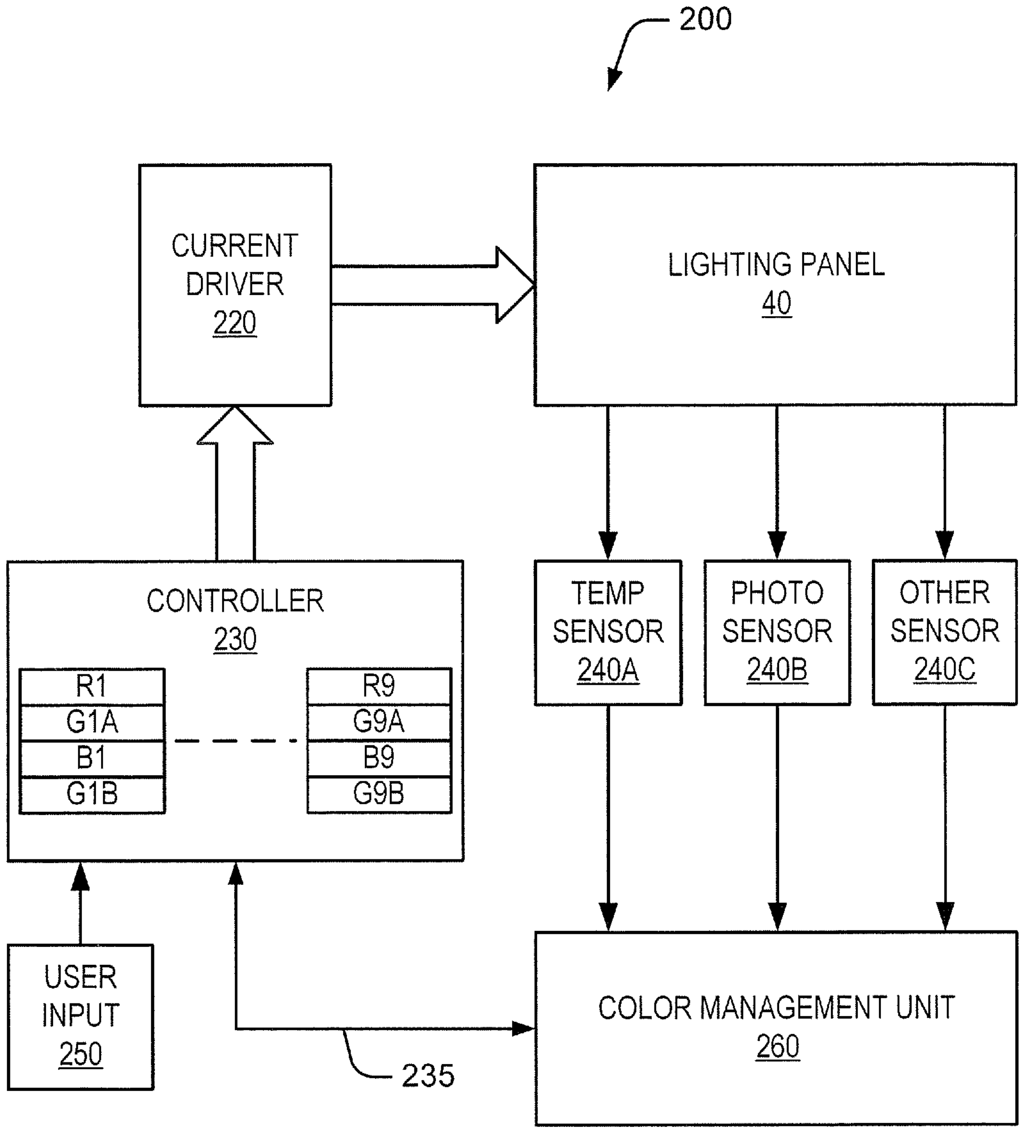
FIG. 5 is a schematic block diagram illustrating a lighting panel system in accordance with some embodiments of the invention.

Accordingly, referring to FIG. 5, a lighting panel system 200 is shown. The lighting panel system 200, which may be a backlight for an LCD display, includes a lighting panel 40. The lighting panel 40 may include, for example, a plurality of bar assemblies 30, which, as described above, may include a plurality of tiles 10. However, it will be appreciated that embodiments of the invention may be employed in conjunction with lighting panels formed in other configurations. For example, some embodiments of the invention may be employed with solid state backlight panels that include a single, large area tile.

In particular embodiments, however, a lighting panel 40 may include a plurality of bar assemblies 30, each of which may have four cathode connectors and four anode connectors corresponding to the anodes and cathodes of four independent strings 23 of LEDs each having the same dominant wavelength. For example, each bar assembly 30 may have a red string, two green strings, and a blue string, each with a corresponding pair of anode/cathode contacts on one side of the bar assembly 30. In particular embodiments, a lighting panel 40 may include nine bar assemblies 30. Thus, a lighting panel 40 may include 36 separate LED strings.

A current driver 220 provides independent current control for each of the LED strings 23 of the lighting panel 40. For example, the current driver 220 may provide independent current control for 36 separate LED strings in the lighting panel 40. The current driver 220 may provide a constant current source for each of the 36 separate LED strings of the lighting panel 40 under the control of a controller 230. In some embodiments, the controller 230 may be implemented using an 8-bit microcontroller such as a PIC18F8722 from Microchip Technology Inc., which may be programmed to provide pulse width modulation (PWM) control of 36 separate current supply blocks within the driver 220 for the 36 LED strings 23.

Pulse width information for each of the 36 LED strings 23 may be obtained by the controller 230 from a color management unit 260, which may in some embodiments include a color management controller such as the Agilent HDJD-J822-SCR00 color management controller.

The color management unit 260 may be connected to the controller 230 through an I2C (Inter-Integrated Circuit) communication link 235. The color management unit 260 may be configured as a slave device on an I2C communication link 235, while the controller 230 may be configured as a master device on the link 235. I2C communication links provide a low-speed signaling protocol for communication between integrated circuit devices. The controller 230, the color management unit 260 and the communication link 235 may together form a feedback control system configured to control the light output from the lighting panel 40. The registers R1-R9, etc., may correspond to internal registers in the controller 230 and/or may correspond to memory locations in a memory device (not shown) accessible by the controller 230.

The controller 230 may include a register, e.g. registers R1-R9, G1A-G9A, B1-B9, G1B-G9B, for each LED string 23, i.e. for a lighting unit with 36 LED strings 23, the color management unit 260 may include at least 36 registers. Each of the registers is configured to store pulse width information for one of the LED strings 23. The initial values in the registers may be determined by an initialization/calibration process. However, the register values may be adaptively changed over time based on user input 250 and/or input from one or more sensors 240A-C coupled to the lighting panel 40.

The sensors 240A-C may include, for example, a temperature sensor 240A, one or more photosensors 240B, and/or one or more other sensors 240C. In particular embodiments, a lighting panel 40 may include one photosensor 240B for each bar assembly 30 in the lighting panel. However, in other embodiments, one photosensor 240B could be provided for each LED string 30 in the lighting panel. In other embodiments, each tile 10 in the lighting panel 40 may include one or more photosensors 240B.

In some embodiments, the photosensor 240B may include photo-sensitive regions that are configured to be preferentially responsive to light having different dominant wavelengths. Thus, wavelengths of light generated by different LED strings 23, for example a red LED string 23A and a blue LED string 23C, may generate separate outputs from the photosensor 240B. In some embodiments, the photosensor 240B may be configured to independently sense light having dominant wavelengths in the red, green and blue portions of the visible spectrum. The photosensor 240B may include one or more photosensitive devices, such as photodiodes. The photosensor 240B may include, for example, an Agilent HDJD-S831-QT333 tricolor photo sensor.

Sensor outputs from the photosensors 240B may be provided to the color management unit 260, which may be configured to sample such outputs and to provide the sampled values to the controller 230 to adjust the register values for corresponding LED strings 23 to correct variations in light output on a string-by-string basis. In some embodiments, an application specific integrated circuit (ASIC) may be provided on each tile 10 along with one or more photosensors 240B in order to pre-process sensor data before it is provided to the color management unit 260. Furthermore, in some embodiments, the sensor output and/or ASIC output may be sampled directly by the controller 230.

The photosensors 240B may be arranged at various locations within the lighting panel 40 in order to obtain representative sample data. Alternatively and/or additionally, light guides such as optical fibers may be provided in the lighting panel 40 to collect light from desired locations. In that case, the photosensors 240B need not be arranged within an optical display region of the lighting panel 40, but could be provided, for example, on the back side of the lighting panel 40. Further, an optical switch may be provided to switch light from different light guides which collect light from different areas of the lighting panel 40 to a photosensor 240B. Thus, a single photosensor 240B may be used to sequentially collect light from various locations on the lighting panel 40.

The user input 250 may be configured to permit a user to selectively adjust attributes of the lighting panel 40, such as color temperature, brightness, hue, etc., by means of user controls such as input controls on an LCD panel.

The temperature sensor 240A may provide temperature information to the color management unit 260 and/or the controller 230, which may adjust the light output from the lighting panel on a string-to-string and/or color-to-color basis based on known/predicted brightness vs. temperature operating characteristics of the LED chips 16 in the strings 23.

Accordingly, the sensors 240A-C, the controller 230, the color management unit 260 and the current driver 220 form a closed loop feedback control system for controlling the lighting panel 40. For example, the feedback control system may be utilized to maintain the output of the lighting panel 40 at a desired luminance and/or color point. Although the color management unit 260 is illustrated as a separate element, it will be appreciated that the functionality of the color management unit 260 may in some embodiments be performed by another element of the control system, such as the controller 230.

Various configurations of photosensors 240B are shown in FIGS. 6A-6D. For example, in the embodiments of FIG. 6A, a single photosensor 240B is provided in the lighting panel 40. The photosensor 240B may be provided at a location where it may receive an average amount of light from more than one tile/string in the lighting panel.

Figure 6A:
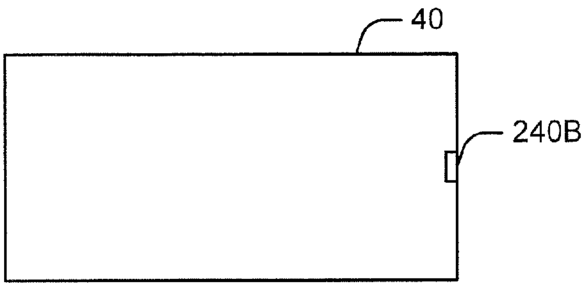
FIGS. 6A-6D are a schematic diagrams illustrating possible configurations of photosensors on a lighting panel in accordance with some embodiments of the invention.
Figure 6B:
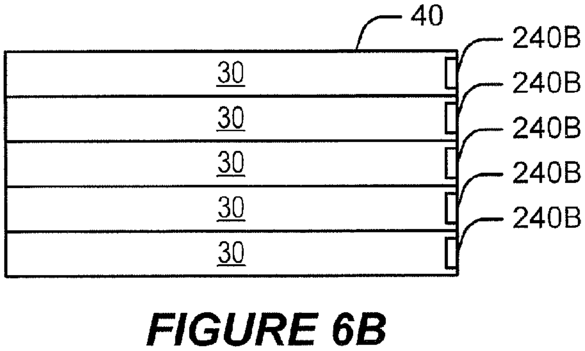

In order to provide more extensive data regarding light output characteristics of the lighting panel 40, more than one photosensor 240B may be used. For example, as shown in FIG. 6B, there may be one photosensor 240B per bar assembly 30. In that case, the photosensors 240B may be located at ends of the bar assemblies 30 and may be arranged to receive an average/combined amount of light emitted from the bar assembly 30 with which they are associated.

Figure 6C:
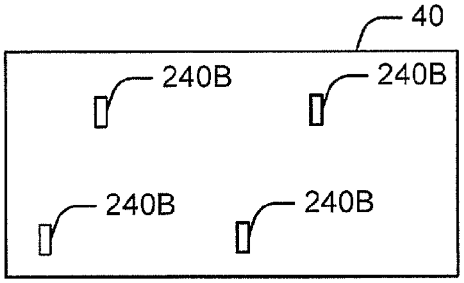
Figure 6D:
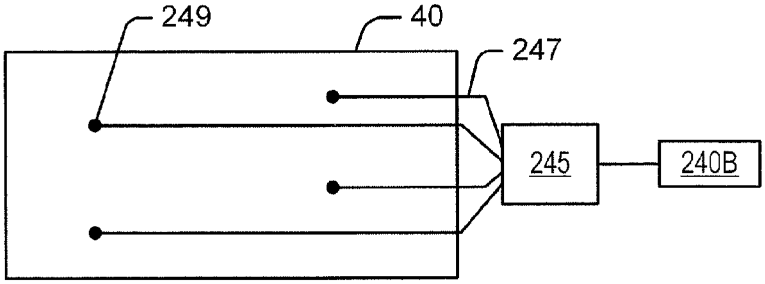

As shown in FIG. 6C, photosensors 240B may be arranged at one or more locations within a periphery of the light emitting region of the lighting panel 40. However in some embodiments, the photosensors 240B may be located away from the light emitting region of the lighting panel 40, and light from various locations within the light emitting region of the lighting panel 40 may be transmitted to the sensors 240B through one or more light guides. For example, as shown in FIG. 6D, light from one or more locations 249 within the light emitting region of the lighting panel 40 is transmitted away from the light emitting region via light guides 247, which may be optical fibers that may extend through and/or across the tiles 10. In the embodiments illustrated in FIG. 6D, the light guides 247 terminate at an optical switch 245, which selects a particular guide 247 to connect to the photosensor 240B based on control signals from the controller 230 and/or from the color management unit 260. It will be appreciated, however, that the optical switch 245 is optional, and that each of the light guides 245 may terminate at a photosensor 240B. In further embodiments, instead of an optical switch 245, the light guides 247 may terminate at a light combiner, which combines the light received over the light guides 247 and provides the combined light to a photosensor 240B. The light guides 247 may extend across partially across and/or through the tiles 10. For example, in some embodiments, the light guides 247 may run behind the panel 40 to various light collection locations and then run through the panel at such locations. Furthermore, the photosensor 240B may be mounted on a front side of the panel (i.e. on the side of the panel 40 on which the lighting devices 16 are mounted) or on a reverse side of the panel 40 and/or a tile 10 and/or bar assembly 30.

Figure 7:
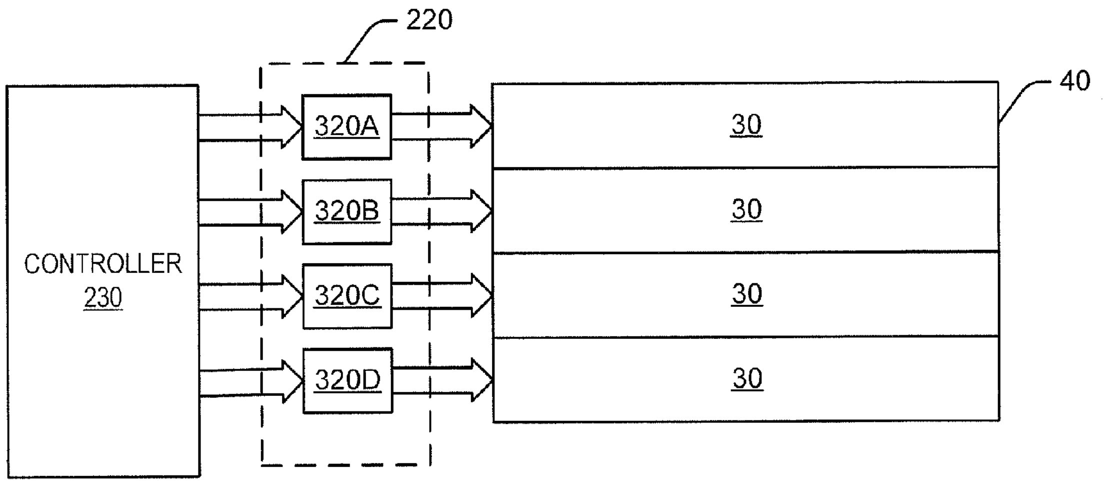
FIGS. 7 and 8 are schematic diagrams illustrating elements of a lighting panel system according to some embodiments of the invention.
Figure 8:
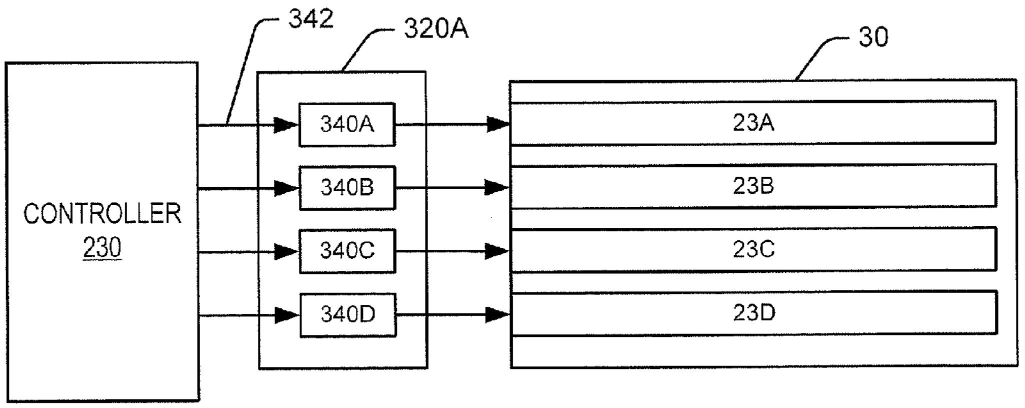

Referring now to FIG. 7, the current driver 220 may include a plurality of bar driver circuits 320A-320D. One bar driver circuit 320A-320D may be provided for each bar assembly 30 in a lighting panel 40. In the embodiments shown in FIG. 7, the lighting panel 40 includes four bar assemblies 30. However, in some embodiments the lighting panel 40 may include nine bar assemblies 30, in which case the current driver 220 may include nine bar driver circuits 320. As shown in FIG. 8, in some embodiments, each bar driver circuit 320 may include four current supply circuits 340A-340D, e.g., one current supply circuit 340A-340D for each LED string 23A-23D of the corresponding bar assembly 30. Operation of the current supply circuits 340A-340B may be controlled by control signals 342 from the controller 230.

The current supply circuits 340A-340B are configured to supply current to the corresponding LED strings 13 while a pulse width modulation signal PWM for the respective strings 13 is a logic HIGH. Accordingly, for each timing loop, the PWM input of each current supply circuit 340 in the driver 220 is set to logic HIGH at the first clock cycle of the timing loop. The PWM input of a particular current supply circuit 340 is set to logic LOW, thereby turning off current to the corresponding LED string 23, when a counter in the controller 230 reaches the value stored in a register of the controller 230 corresponding to the LED string 23. Thus, while each LED string 23 in the lighting panel 40 may be turned on simultaneously, the strings may be turned off at different times during a given timing loop, which would give the LED strings different pulse widths within the timing loop. The apparent brightness of an LED string 23 may be approximately proportional to the duty cycle of the LED string 23, i.e., the fraction of the timing loop in which the LED string 23 is being supplied with current.

An LED string 23 may be supplied with a substantially constant current during the period in which it is turned on. By manipulating the pulse width of the current signal, the average current passing through the LED string 23 may be altered even while maintaining the on-state current at a substantially constant value. Thus, the dominant wavelength of the LEDs 16 in the LED string 23, which may vary with applied current, may remain substantially stable even though the average current passing through the LEDs 16 is being altered. Similarly, the luminous flux per unit power dissipated by the LED string 23 may remain more constant at various average current levels than, for example, if the average current of the LED string 23 were being manipulated using a variable current source. In other embodiments, however, the LED string 23 may not be supplied with a substantially constant current during activation thereof.

The value stored in a register of the controller 230 corresponding to a particular LED string may be based on a value received from the color management unit 260 over the communication link 235. Alternatively and/or additionally, the register value may be based on a value and/or voltage level directly sampled by the controller 230 from a sensor 240.

In some embodiments, the color management unit 260 may provide a value corresponding to a duty cycle (i.e. a value from 0 to 100), which may be translated by the controller 230 into a register value based on the number of cycles in a timing loop. For example, the color management unit 260 indicates to the controller 230 via the communication link 235 that a particular LED string 23 should have a duty cycle of 50%. If a timing loop includes 10,000 clock cycles, then assuming the controller increments the counter with each clock cycle, the controller 230 may store a value of 5000 in the register corresponding to the LED string in question. Thus, in a particular timing loop, the counter is reset to zero at the beginning of the loop and the LED string 23 is turned on by sending an appropriate PWM signal to the current supply circuit 340 serving the LED string 23. When the counter has counted to a value of 5000, the PWM signal for the current supply circuit 340 is reset, thereby turning the LED string off.

In some embodiments, the pulse repetition frequency (i.e. pulse repetition rate) of the PWM signal may be in excess of 60 Hz. In particular embodiments, the PWM period may be 5 ms or less, for an overall PWM pulse repetition frequency of 200 Hz or greater. A delay may be included in the loop, such that the counter may be incremented only 100 times in a single timing loop. Thus, the register value for a given LED string 23 may correspond directly to the duty cycle for the LED string 23. However, any suitable counting process may be used provided that the brightness of the LED string 23 is appropriately controlled.

The register values of the controller 230 may be updated from time to time to take into account changing sensor values. In some embodiments, updated register values may be obtained from the color management unit 260 multiple times per second.

Furthermore, the data read from the color management unit 260 by the controller 230 may be filtered to limit the amount of change that occurs in a given cycle. For example, when a changed value is read from the color management unit 260, an error value may be calculated and scaled to provide proportional control ("P"), as in a conventional PID (Proportional-Integral-Derivative) feedback controller. Further, the error signal may be scaled in an integral and/or derivative manner as in a PID feedback loop. Filtering and/or scaling of the changed values may be performed in the color management unit 260 and/or in the controller 230. In some embodiments, calibration of a display system 200 may be performed by the display system itself (i.e. self-calibration), for example, using signals from photosensors 240B. However, in some embodiments of the invention, calibration of a display system 200 may be performed by an external calibration system.

Figure 9:
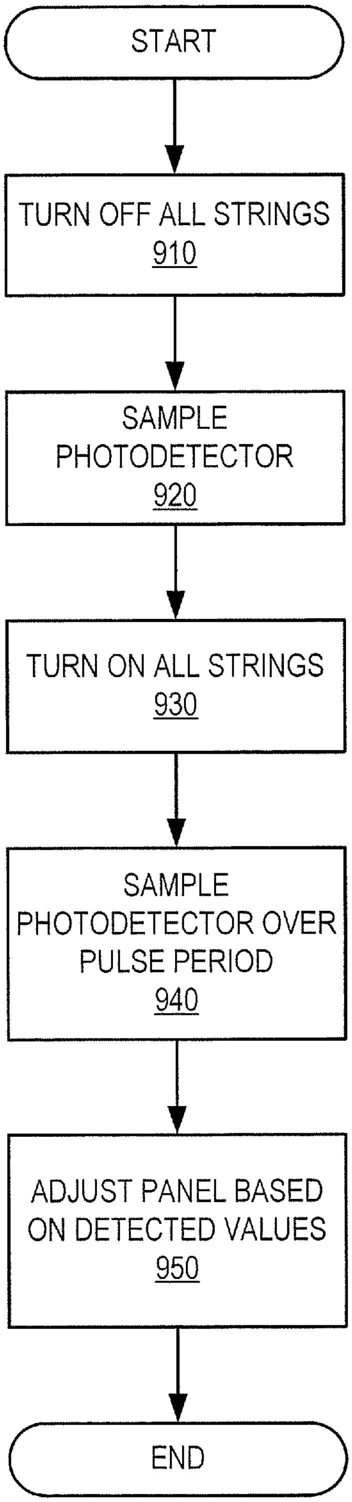
FIG. 9 is a flowchart illustrating calibration methods according to some embodiments of the invention.

Some aspects of self-calibration of the display system 200 are illustrated in FIG. 9. In some embodiments, the controller 230 may cause the color management unit 260 to sample a photosensor 240B when the lighting panel 40 is in a momentarily dark state (i.e. such that all of the light sources within the unit are momentarily switched off) in order to obtain a measure of ambient light (e.g. a dark signal value). The controller 230 may also cause the color management unit 260 to sample the photosensor 240B during a time interval in which the display is lighted for at least a portion of the interval in order to obtain a measure of the display brightness (e.g. a light signal value). For example, the controller 230 may cause the color management unit 260 to obtain a value from the photosensor that represents an average over an entire timing loop.

More particularly, referring to FIG. 9, all LED strings in the lighting panel 40 are turned off (block 910), and the photosensor 240B output is sampled to obtain a dark signal value (block 920). The LED strings are then energized (block 930), and the display output is integrated over an entire pulse period and sampled (block 940) to obtain a light signal value. The output of the lighting panel 40 is then adjusted based on the dark signal value and/or the light signal value (block 950). In some embodiments, the operations of FIG. 9 may be performed as part of a testing process and/or during normal usage of the lighting panel 40. As such, the operations of FIG. 9 may be performed periodically, responsive to detecting changes in ambient light, and/or when the panel 40 is turned on.

The brightness of the lighting panel 40 may be adjusted to account for differences in ambient light. For example, in situations in which the level of ambient light is high, the brightness of the lighting panel 40 may be increased via a positive feedback signal in order to maintain a substantially consistent contrast ratio. In other situations in which the level of ambient light is low, a sufficient contrast ratio may be maintained with a lower brightness, so the display brightness may be decreased by a negative feedback signal.

As explained above, the brightness of the lighting panel 40 may be adjusted by adjusting the pulse widths of the current pulses for one or more (or all) of the LED strings 23 in the lighting panel 40. In some embodiments, the pulse widths may be adjusted based on a difference between the sensed display brightness and the sensed ambient brightness. In other embodiments, the pulse widths may be adjusted based on a ratio of the sensed display brightness (the light signal value) to the sensed ambient brightness (the dark signal value).

Accordingly, in some embodiments, the feedback loop formed by the lighting panel 40, the photosensor 240B, the color management unit 260 and the controller 230 may tend to maintain the average luminosity of the lighting panel 40 independent of ambient illumination. In other embodiments, the feedback loop may be configured to maintain a desired relationship between the average luminosity of the lighting panel 40 and the level of ambient illumination.

In some embodiments, the feedback loop may employ digital incremental logic. The digital incremental logic of the feedback loop may reference indices of a lookup table including a list of values such as duty cycle values.

Same colored LED strings in a lighting panel need not be driven with the same pulse width. For example, a backlight panel 40 may include a plurality of red LED strings 23, each of which may be driven with a different pulse width, resulting in a different average current level. Accordingly, some embodiments of the invention provide a closed loop digital control system for a lighting panel, such as an LCD backlight, that includes first and second LED strings 23 that include a plurality of LED chips 16 therein that emit narrow band optical radiation having a first dominant wavelength when energized, and third and fourth LED strings 23 that include a plurality of LED chips 16 that emit narrow band optical radiation having a second dominant wavelength, different from the first dominant wavelength.

In some embodiments, the first and second LED strings 23 are maintained at a different average current level than one another yet are driven at substantially the same on-state current. Likewise, the third and fourth LED strings are maintained at different average current levels than one another yet are driven at substantially the same on-state current.

The on-state current of the first and second LED strings 23 may be different than the on-state current of the third and fourth LED strings. For example, the on-state current used to drive red LED strings 23 may be different than the on-state current used to drive green and/or blue LED strings. The average current of a string 23 is proportional to the pulse width of the current through the string 23. The ratio of average current between the first and second LED strings 23 may be maintained relatively constant, and/or the ratio of average current between the third and fourth LED strings 23 may be maintained relatively constant. Furthermore, the ratio of average current between the first and second LED strings 23 compared to the average current of the third and fourth LED strings 23 may be allowed to change as part of the closed loop control in order to maintain a desired display white point.

In some embodiments, the on-state current level provided to a given LED string 23 may be adjusted by the current supply circuit 340 in response to commands from the controller 230. In that case, a particular LED string may be driven at an on-state current level selected to adjust a dominant wavelength of a particular LED string 23. For example, due to chip-to-chip variations in dominant wavelength, a particular LED string 23 may have an average dominant wavelength that is higher than an average dominant wavelength of other LED strings 23 of the same color within a lighting panel 40. In that case, it may be possible to drive the higher-wavelength LED string at a slightly higher on-state current, which may cause the dominant wavelength of the LED string 23 to drop and better match that of the shorter-wavelength LED strings 23.

In some embodiments, the initial on-state drive currents of each of the LED strings 23 may be calibrated by a calibration process in which each of the LED strings is individually energized and the light output from each string is detected. The dominant wavelength of each string may be measured, and an appropriate drive current may be calculated for each LED string in order to adjust the dominant wavelength as necessary. For example, the dominant wavelengths of each of the LED strings 23 of a particular color may be measured and the variance of the dominant wavelengths for a particular color may be calculated. If the variance of the dominant wavelengths for the color is greater than a predetermined threshold, or if the dominant wavelength of a particular LED string 23 is higher or lower than the average dominant wavelength of the LED strings 23 by a predetermined number of standard deviations, then the on-state drive current of one or more of the LED strings 23 may be adjusted in order to reduce the variance of dominant wavelengths. The calibration process may be performed once, repeatedly, periodically, and/or in response to some measured change. Other methods/algorithms may be used in order to correct/account for differences in dominant wavelength from string to string.

Figure 10:
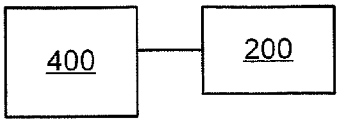
FIGS. 10-12 are schematic diagrams illustrating calibration systems according to some embodiments of the invention.

Referring to FIG. 10, an external calibration system 400 may be coupled to a lighting system 200 so that the calibration system 400 can control certain operations of the lighting system 200 in order to calibrate the lighting system 200. For example, the calibration system 200 may cause the lighting system 200 to selectively illuminate one or more LED strings 23 for a desired time at a desired duty cycle in order to measure light output by the lighting system 200.

Figure 11:
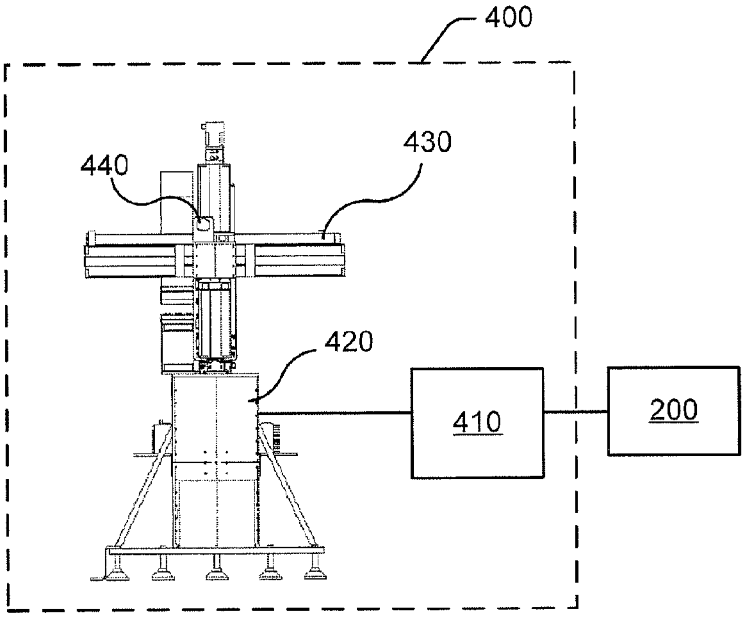

Referring to FIG. 11, a calibration system 400 may include a calibration controller 410 that is coupled to the lighting system 200 and that is configured to control certain operations of the lighting system 200 as well as other elements of the calibration system 400. The calibration system 400 further includes a stand 420 on which an XY positioner 430 is mounted, and a spectrometer or colorimeter 440 mounted on the XY positioner. The XY positioner 430 is configured to move the colorimeter 440 in two dimensions (e.g. horizontally and vertically) in order to position the colorimeter 440 at a desired location relative to a lighting panel being calibrated. The XY positioning system 430 may include a linear positioning system manufactured by Techno, Inc. The calorimeter 440 may include a PR-650 SpectraScan® Colorimeter from Photo Research Inc.

Figure 12:
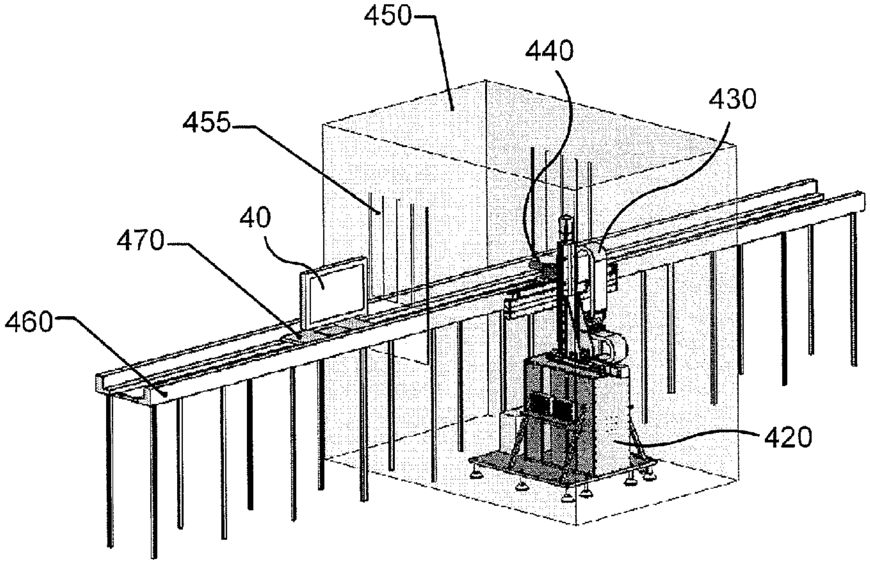

Referring to FIG. 12, the calorimeter 440 and XY positioning system 430 may be located within a darkened enclosure 450 that includes an entrance 455 that may be shrouded by vertical black cloth strips to reduce/prevent external light from entering the enclosure 450. A conveyor 460 extends from outside the enclosure 450 to the interior of the enclosure 450 through the entrance 455. A lighting panel 40 of a lighting system 200 is carried into the enclosure 450 on a pallet 470 by the conveyor 460, where the colorimeter 440 can measure light output by the lighting panel 40 in response to commands from the calibration controller 410. Accordingly, the calorimeter 440 can be positioned at various locations around the lighting panel 40, and may measure the luminance and/or color of the light output by the lighting panel 40 at the various locations.

Figure 13:
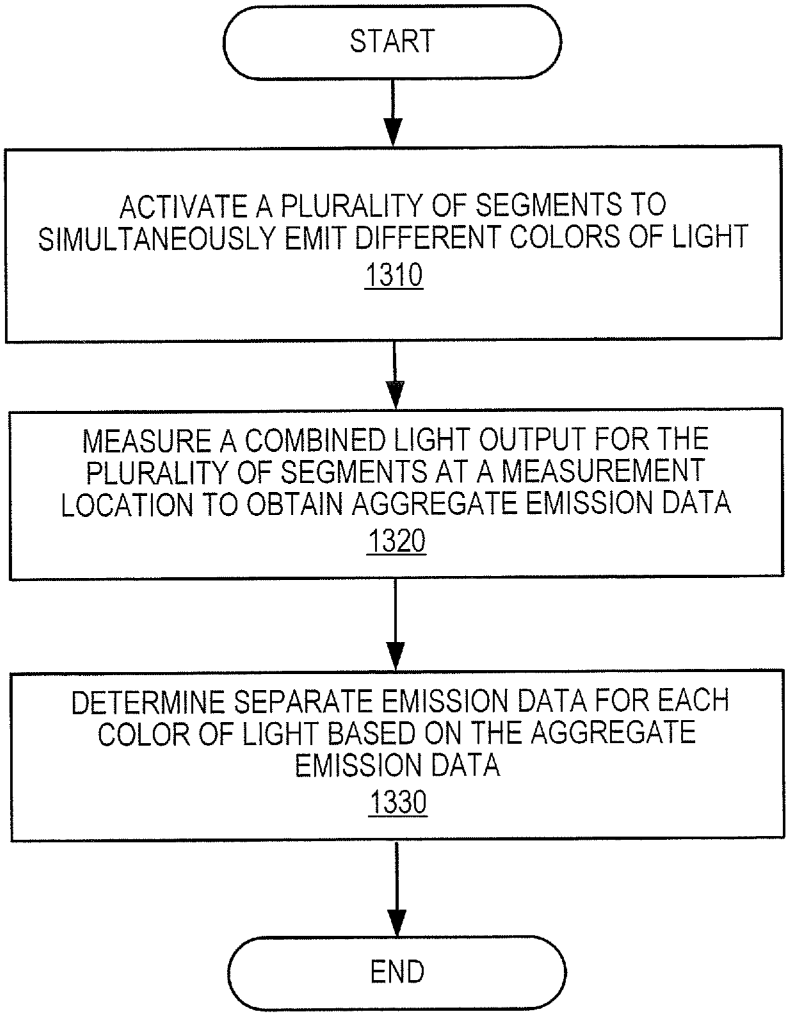
FIG. 13 is a flowchart illustrating calibration operations according to some embodiments of the invention.
Figure 14A:
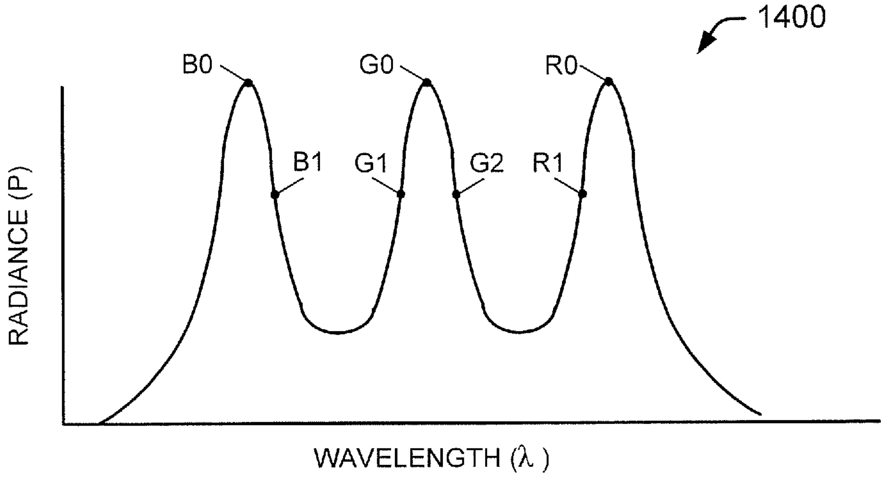
FIGS. 14A and 14B are graphs illustrating derivation of separate emission data according to some embodiments of the present invention; is a . . . aspects of the invention.
Figure 14B:
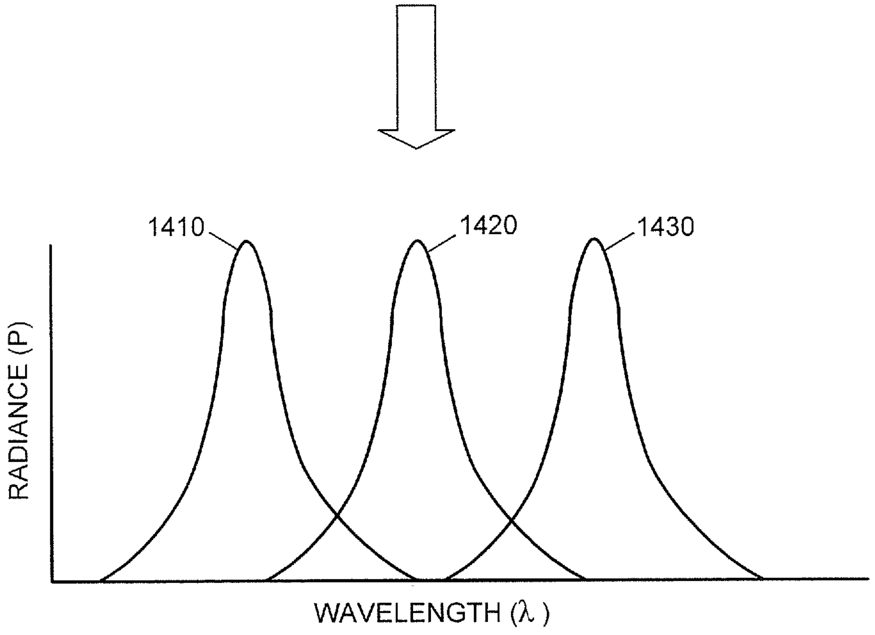

FIGS. 13, 14 A-B, and 15 illustrate further operations according to some embodiments of the invention associated with calibrating a lighting panel 40 having M segments, such as bars 30 and/or tiles 10. As discussed herein with reference to FIGS. 13, 14A-B and 15, the segments of the lighting panel 40 refer to the bars 30, each of which may include a group of tiles 10. The lighting panel 40 may be calibrated by measuring the light output by the bars 30 from N different locations. In some embodiments, the number of bars 30 may be 9 (i.e. M=9), and/or the number of measurement locations N may be 3.

Referring now to FIG. 13, calibration of a lighting panel 40 may include activating the different color LED strings 23 on the bars 30 such that the bars 30 simultaneously emit different colors of light (block 1310). More particularly, the bars 30 are activated to simultaneously emit red, green, and blue light, the combination of which results in white light output by the lighting panel 40. The combined light output is measured at one or more measurement locations relative to the lighting panel 40 being calibrated to obtain aggregate emission data for the lighting panel (block 1320), for example, using the calorimeter 440. More particularly, an overall spectral distribution (also referred to herein as a "white" spectral distribution) for the lighting panel 40 may be obtained based on measurement of the combined light output when the different colored LED strings 23 are activated. Separate emission data for each color of light is thereby determined based on the aggregate emission data for the combined light output (block 1330), for example, using extrapolation techniques as discussed in greater detail below.

FIG. 14A is a graph illustrating an example of the overall spectral distribution 1400 that may be obtained based on measurement of the combined light output of the lighting panel 40 when the different colored LED strings 23 are activated to simultaneously emit red, green, and blue light. As shown in FIG. 14A, the overall spectral distribution 1400 includes local peaks B0, G0, and R0 within the wavelength ranges corresponding to blue, green, and red light, respectively. As each of the three colors of light that make up the overall spectral distribution 1400 are relatively narrowband, separate blue, green, and red emission data may be derived from the overall spectral distribution 1400. More particularly, the overall spectral distribution 1400 can be digitally analyzed by the calibration system 400 to generate three separate spectral distributions 1410, 1420, and 1430 respectively corresponding to the blue, green, and red light output by the lighting panel 40, as shown in FIG. 14B. For example, the separate distributions 1410, 1420, and 1430 may be generated based on the overall spectral distribution 1400 and expected spectral distributions for red, green, and blue light using extrapolation techniques, such as polynomial extrapolation (also referred to herein as "curve fitting"). Information about the individual colors at the measurement location (such as luminance and/or chromaticity) can then be calculated from the separate spectral distributions 1410, 1420, and 1430.

Figure 15:
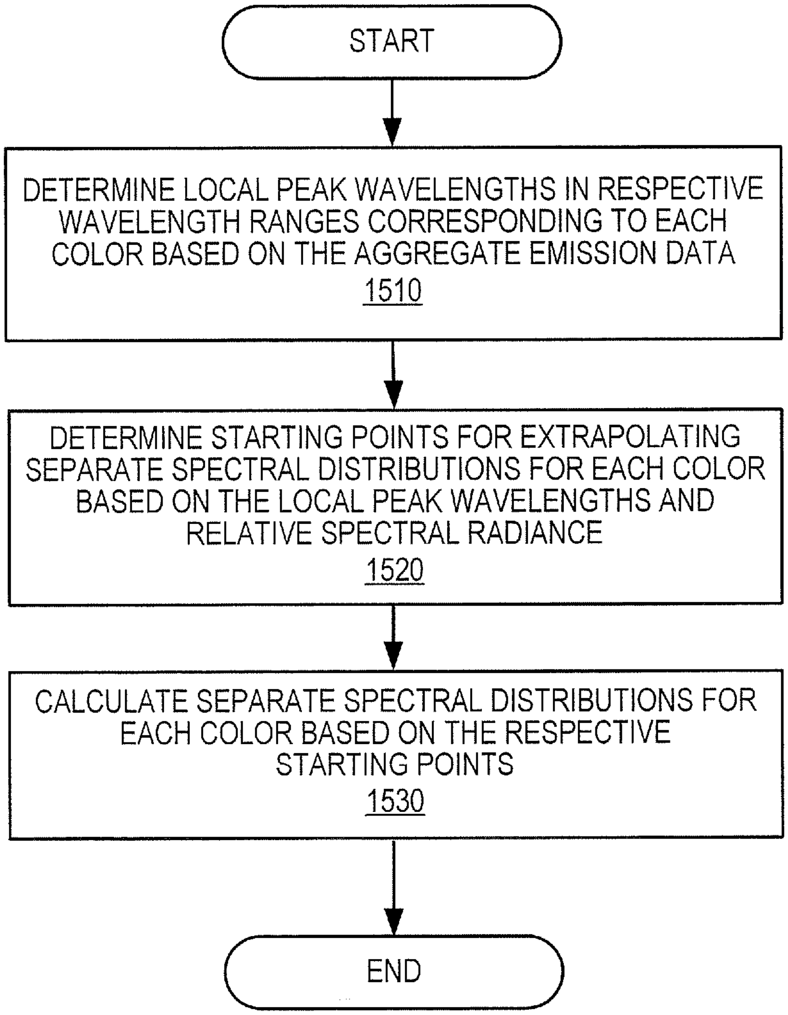
FIG. 15 is a flowchart illustrating derivation operations according to some embodiments of the present invention.

Operations for determining the separate emission data for each color are further illustrated in FIG. 15. As shown in FIG. 15, local peak wavelengths $\lambda_{B0}$, $\lambda_{G0}$, and $\lambda_{R0}$ are determined for each of the wavelength ranges corresponding to blue, green, and red light based on the overall spectral distribution 1400 (block 1510). As used herein, a local peak wavelength refers to the wavelength at which a peak radiance of the overall spectral distribution occurs within a given wavelength range. Based on the local peak wavelengths and relative spectral radiance, starting points for use in extrapolating separate spectral distributions for each color are determined (block 1520). For example, the starting points may be based on wavelengths corresponding to a percentage of the peak radiance value for each local peak wavelength. More particularly, the starting points may be based on the wavelengths along the overall spectral distribution 1400 that correspond to about 30% of the peak radiance values. For example, as shown in FIG. 14A, starting points B1, G1, G2, and R1 are illustrated at points about 30% below the local peak values B0, G0, and R0 along the overall spectral distribution 1400.

The separate spectral distributions for each color are calculated based on the respective starting points using one or more extrapolation algorithms (block 1530). For example, portions of the separate spectral distributions for each color may be extrapolated for wavelength ranges between adjacent ones of the local peaks B0, G0, and R0 of the overall spectral distribution 1400. The extrapolation algorithm used to generate the separate spectral distributions for each color i=R, G, B may be a third-order polynomial curve fitting algorithm:

$$y_i=[a(\lambda-\Delta\lambda_i)^3+b(\lambda-\Delta\lambda_i)^2+c(\lambda-\Delta\lambda_i)+d]*P/100, \quad (1)$$

where P is the local peak radiance value for each color, λ is the wavelength, Δλ is the change in wavelength relative to the wavelengths at starting points B1, G1, G2, and R1, and a, b, c, and d are coefficient values. The change in wavelength $\Delta\lambda_i$ for each color i=R, G, B relative to the wavelengths $\lambda_j$ of the corresponding starting points j=B1, G1, G2, and R1 is calculated as follows:

$$p=(3ac-b^2)/((3a^2) \quad (2a)$$

$$q=(2b^3-9abc+27a^2d)/(27a^3) \quad (2b)$$

$$\Delta=(q^2)/4+(p^3)/27 \quad (2c)$$

$$z1=\{[-(q/2)+sqrt(\Delta)]^{1/3}+[-(q/2)-sqrt(\Delta)]^{1/3}\}^{1/3} \quad (2d)$$

$$x1=z1-b/(3a) \quad (2e)$$

$$\Delta\lambda_i=x1-\lambda_j \quad (2f)$$

Accordingly, the spectral distribution for the blue light $P_{Bfit}(\lambda)$ may be derived using the overall spectral distribution 1400. More particularly, a wavelength $\lambda_{B0}$ and a radiance $P_{B0}$ corresponding to the local peak B0 is determined, and a point B1 that is about 30% below the peak radiance $P_{B0}$ but has a wavelength $\lambda_{B1}$ greater than the peak wavelength $\lambda_{B0}$ is selected as a starting point for the extrapolation algorithm. The change in wavelength $\Delta\lambda_B$ relative to the starting point B1 is calculated as described above (using equations 2a-2f), and the value of $P_{Bfit}(\lambda)$ is calculated using the third order polynomial curve fitting algorithm $y_B$ described above for wavelengths λ over a range of about 380 nm to about 780 nm. More particularly, for wavelengths λ greater than $\lambda_{B1}$ and values of $y_B$ greater than or equal to zero, the value of $P_{Bfit}(\lambda)$ corresponds to the value of $y_B$. However, for wavelengths less than or equal to $\lambda_{B1}$, the value of $P_{Bfit}(\lambda)$ corresponds to the value of the overall spectral distribution 1400, as most of the light in this portion of the overall spectral distribution 1400 corresponds to light emitted by the blue LED strings 23.

The spectral distribution for red light $P_{Rfit}(\lambda)$ may be similarly derived using the overall spectral distribution 1400. More particularly, a wavelength $\lambda_{R0}$ and a radiance $P_{R0}$ corresponding to the local peak R0 is determined, and a point R1 that is about 30% below the peak radiance $P_{R0}$ but has a wavelength $\lambda_{R1}$ less than the peak wavelength $\lambda_{R0}$ is selected as a starting point for the extrapolation algorithm. The change in wavelength $\Delta\lambda_R$ relative to the starting point R1 is calculated as described above (using equations 2a-2f), and the value of $P_{Rfit}(\lambda)$ is calculated using the third order polynomial curve fitting algorithm $y_R$ described above for wavelengths $\lambda$ over a range of about 380 nm to about 780 nm. More particularly, for wavelengths $\lambda$ less than $\lambda_{R1}$ and values of $y_R$ greater than or equal to zero, the value of $P_{Rfit}(\lambda)$ corresponds to the value of $y_R$. However, for wavelengths greater than or equal to $\lambda_{R1}$, the value of $P_{Rfit}(\lambda)$ corresponds to the value of the overall spectral distribution 1400, as most of the light in this portion of the overall spectral distribution 1400 corresponds to light emitted by the red LED strings 23.

The spectral distribution for green light $P_{Gfit}(\lambda)$ may also be derived using the overall spectral distribution 1400. More particularly, a wavelength $\lambda_{G0}$ and a radiance $P_{G0}$ corresponding to the local peak G0 is determined, and points G1 and G2 that are about 30% below the peak radiance $P_{G0}$ are selected as starting points for the extrapolation algorithm. The point G1 is about 30% below the peak radiance $P_{G0}$ but has a wavelength $\lambda_{G1}$ less than the peak wavelength $\lambda_{G0}$. The point G2 is also about 30% below the peak radiance $P_{G0}$ but has a wavelength $\lambda_{G2}$ greater than the peak wavelength $\lambda_{G0}$. Accordingly, the change in wavelength $\Delta\lambda_{G1}$ relative to the starting point G1 and the change in wavelength $\Delta\lambda_{G2}$ relative to the starting point G2 are calculated as described above (using equations 2a-2f), and the value of $P_{Gfit}(\lambda)$ is calculated using third order polynomial curve fitting algorithms $y_{G1}$ and $y_{G2}$ for wavelengths $\lambda$ over a range of about 380 nm to about 780 nm. More particularly, for wavelengths $\lambda$ less than $\lambda_{G1}$ and values of $y_{G1}$ greater than or equal to zero, the value of $P_{Gfit}(\lambda)$ corresponds to the value of $y_{G1}$. Similarly, for wavelengths $\lambda$ greater than $\lambda_{G2}$ and values of $y_{G2}$ greater than or equal to zero, the value of $P_{Gfit}(\lambda)$ corresponds to the value of $y_{G2}$. However, for wavelengths $\lambda$ between $\lambda_{G1}$ and $\lambda_{G2}$, the value of $P_{Rfit}(\lambda)$ corresponds to the value of the overall spectral distribution 1400 between points G1 and G2, as most of the light in this portion of the overall spectral distribution 1400 corresponds to light emitted by the green LED strings 23.

Accordingly, separate emission data for each of the three colors of light may be derived from a single measurement of the combined light output at each measurement location. In contrast, other methods of calibrating a lighting panel may involve sequentially energizing the red, green and blue LED strings 23 and taking three separate measurements at each measurement location, which may become extremely time consuming in high-volume production. Accordingly, some embodiments of the present invention may offer significant time savings in the calibration process. Moreover, the separate emission data for each color may be used to adjust the duty cycles of the LED strings 23 as described in greater detail below.

Figure 16:
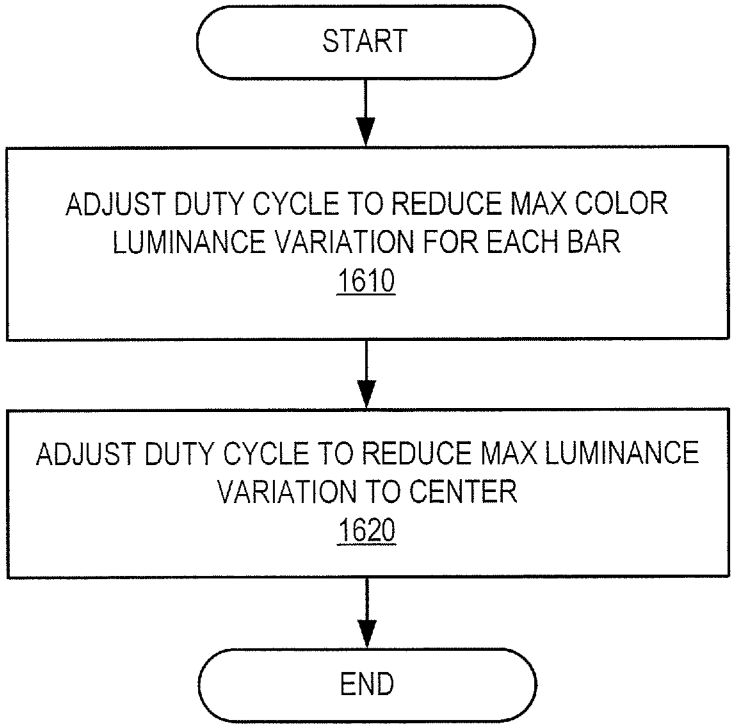
FIGS. 16, 17, 18A and 18B are flowchart diagrams illustrating calibration operations according to some embodiments of the invention.

FIGS. 16, 17, and 18A-B are flowchart diagrams that illustrate further operations according to some embodiments of the invention associated with calibrating a lighting panel 40 having M segments, such as bars 30. Referring to FIG. 16, calibration of a lighting panel 40 may include adjusting the duty cycles of the LED strings 23 on the bars 30 to reduce the maximum color luminance variation for each bar 30 to below a first threshold variation (block 1610) and adjusting the duty cycles of the LED strings 23 to reduce a maximum luminance variation to the center of the lighting panel to below a second threshold value (block 1620).

Figure 17:
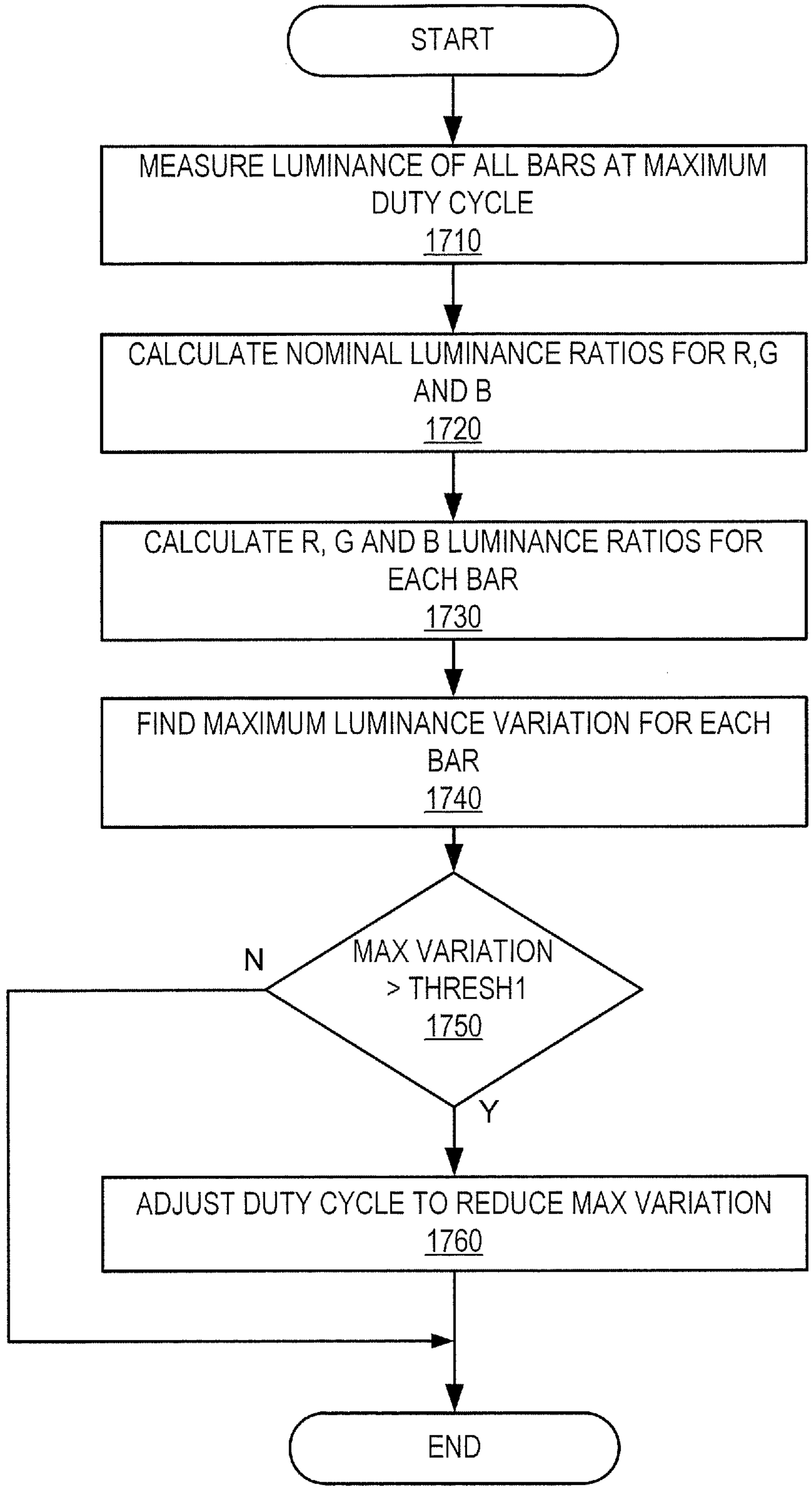

Adjusting duty cycles of the bars 30 to reduce the maximum color luminance variation for each bar is illustrated in FIG. 17. As shown therein, the luminance of all bars is measured at maximum duty cycle (block 1710). That is, the red, blue, and green LEDs of each bar 30 are simultaneously energized at a 100% duty cycle, and N measurements are taken for each bar. The measurements may include measurement of an aggregate or total luminance Y of each bar m 0 [1 . . . M] and/or each measurement location n 0 [1 . . . N]. The CIE chromaticity (x, y) may also be measured for each bar/location. Measurements may be taken using, for example, a PR-650 SpectraScan® Colorimeter from Photo Research Inc., which can be used to make direct measurements of luminance, CIE Chromaticity (1931 xy and 1976 u'v') and/or correlated color temperature. The individual luminance for each color may be determined from the measured total luminance Y at each measurement location by calculating separate luminance data based on the measured total luminance Y as described above with reference to FIGS. 13-15.

Next, nominal luminance ratios are calculated for each color (block 1720). In order to calculate nominal luminance ratios, total luminance values for each color $Y_{R,total}$, $Y_{G,total}$, and $Y_{B,total}$ are calculated as follows:

$$Y_{R,total}=\sum_{m,n} Y_{Rmn} \quad (3a)$$

$$Y_{G,total}=\sum_{m,n} Y_{Gmn} \quad (3b)$$

$$Y_{B,total}=\sum_{m,n} Y_{Bmn} \quad (3c)$$

The nominal RGB luminance ratios may then be calculated for each color as a ratio of the total luminance of a color to the total luminance of all colors as follows:

$$Y_{R|ratio}=Y_{R,total}/(Y_{R,total}+Y_{G,total}+Y_{B,total}) \quad (4a)$$

$$Y_{G|ratio}=Y_{G,total}/(Y_{R,total}+Y_{G,total}+Y_{B,total}) \quad (4b)$$

$$Y_{B|ratio}=Y_{B,total}/(Y_{R,total}+Y_{G,total}+Y_{B,total}) \quad (4c)$$

Next, for each bar, luminance ratios are calculated for each color (block 1730), as follows. First, a total luminance is calculated for each bar as follows:

$$Y_{Rm,total}=\sum_{n} Y_{Rmn} \quad (5a)$$

$$Y_{Gm,total}=\sum_{n} Y_{Gmn} \quad (5b)$$

$$Y_{Bm,total}=\sum_{n} Y_{Bmn} \quad (5c)$$

Then, for each bar, a luminance ratio for each color is calculated as a ratio of the total luminance of a color emitted by a bar to the total luminance of all colors emitted by the bar, as follows:

$$Y_{Rm|ratio}=Y_{Rm,total}/(Y_{Rm,total}+Y_{Gm,total}+Y_{Bm,total}) \quad (6a)$$

$$Y_{Gm|ratio}=Y_{Gm,total}/(Y_{Rm,total}+Y_{Gm,total}+Y_{Bm,total}) \quad (6b)$$

$$Y_{Bm|ratio}=Y_{Bm,total}/(Y_{Rm,total}+Y_{Gm,total}+Y_{Bm,total}) \quad (6c)$$

A maximum variation from the nominal luminance ratio for each bar may then be obtained (block 1740) by calculating a variation from the nominal luminance ratio for each color and for each bar as follows:

$$\Delta Y_{Rm|ratio}=(Y_{Rm|ratio}-Y_{R|ratio})/Y_{R|ratio} \quad (7a)$$

$$\Delta Y_{Gm|ratio}=(Y_{Gm|ratio}-Y_{G|ratio})/Y_{G|ratio} \quad (7b)$$

$$\Delta Y_{Bm|ratio}=(Y_{Bm|ratio}-Y_{B|ratio})/Y_{B|ratio} \quad (7c)$$

The maximum variation from the nominal luminance ratio may then be obtained for each bar as follows:

$$\Delta Y_{m|ratio,max}=\max(\Delta Y_{Rm|ratio}, \Delta Y_{Gm|ratio}, \Delta Y_{Bm|ratio}) \quad (8)$$

If in block 1750 it is determined that the maximum variation from the nominal luminance ratio for a bar is greater than a first threshold THRESH1, then the duty cycles of the colors of the bar are adjusted to reduce the maximum variation from the nominal luminance ratio (block 1760) to below the first threshold THRESH1. The first threshold THRESH1 may be less than 1%. For example, the first threshold THRESH1 may be 0.4% in some embodiments.

The duty cycles of the colors of a bar may be adjusted by first selecting the color with the lowest relative luminance as follows:

$$\Delta Y_{Km|ratio,min}=\min(\Delta Y_{Rm|ratio}, \Delta Y_{Gm|ratio}, \Delta Y_{Bm|ratio}) \quad (9)$$

where K=R, G or B; color K has the lowest relative luminance. A duty cycle coefficient for each color is then calculated for each bar to provide color uniformity as follows:

$$C_{Km}=Y_{Km|ratio}/Y_{K|ratio} \quad (10)$$

where K=R, G or B; color K has the lowest relative luminance.

The duty cycles (DC) for each color are then adjusted for color balance as follows:

$$DC_{Rm}=C_{Km}*Y_{R|ratio}/Y_{Rm|ratio} \quad (11a)$$

$$DC_{Gm}=C_{Km}*Y_{G|ratio}/Y_{Gm|ratio} \quad (11b)$$

$$DC_{Bm}=C_{Km}*Y_{B|ratio}/Y_{Bm|ratio} \quad (11c)$$

Figure 18A:
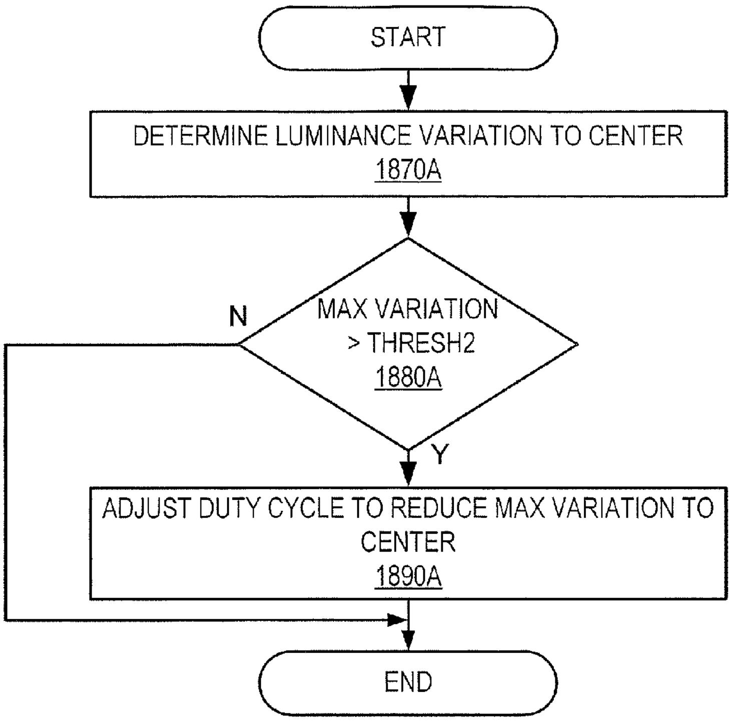

Referring now to FIG. 18A, the calibration process is continued by determining the luminance variation to center points of the display (block 1870A). First, the luminance after color balance (duty cycle adjustment) for each bar/color/measurement point is calculated as follows:

$$Y_{Rmn}'=DC_{rm}*Y_{Rmn} \quad (12a)$$

$$Y_{Gmn}'=DC_{Gm}*Y_{Gmn} \quad (12b)$$

$$Y_{Bmn}'=DC_{Bm}*Y_{Bmn} \quad (12c)$$

The RGB mixed luminance is then calculated for each position as follows:

$$Y_{mn}'=Y_{Rmn}'+Y_{Gmn}'+Y_{Bmn}' \quad (13)$$

for each of M bars (m 0 [1 . . . M]) and N measurement positions (n 0 [1 . . . N]).

Assuming M=9 and N=3, a center luminance average may be calculated as follows:

$$Y_{center}=(Y_{52}'+Y_{72}'+Y_{32}')/3 \quad (14)$$

A luminance variation to the center luminance average may then be calculated for each bar/measurement position as follows:

$$\Delta Y_{mn}=[Y_{mn}'-\max(Y_{mn}')]/Y_{center} \quad (15)$$

The maximum variation to the center luminance is then compared in block 1880A to a second threshold THRESH2, which may be, for example, 10%. If the maximum variation to the center luminance exceeds the second threshold THRESH2, then the duty cycles are again adjusted to reduce the maximum variation to the center luminance (block 1890A). First, a uniformity coefficient is calculated for each bar as follows:

$$C_m=[1-\min(\Delta Y_{m1}, \ldots, \Delta Y_{mn})]/1.1 \quad (16)$$

A new duty cycle is then calculated as follows:

$$DC_{Rm}'=C_m*DC_{Rm} \quad (17a)$$

$$DC_{Gm}'=C_m*DC_{Gm} \quad (17b)$$

$$DC_{Bm}'=C_m*DC_{Bm} \quad (17c)$$

The maximum duty cycle of all bars/colors is then determined as follows:

$$DC_{max}=\max(DC_{Km}') \quad (18)$$

where K=R, G or B, and m 0 [1 . . . M].

The duty cycles may then be re-normalized such that the maximum duty cycle is 100% as follows:

$$DC_{Rm}''=DC_{Rm}'/DC_{max} \quad (19a)$$

$$DC_{Gm}''=DC_{Gm}'/DC_{max} \quad (19b)$$

$$DC_{Bm}''=DC_{Bm}'/DC_{max} \quad (19c)$$

Figure 18B:
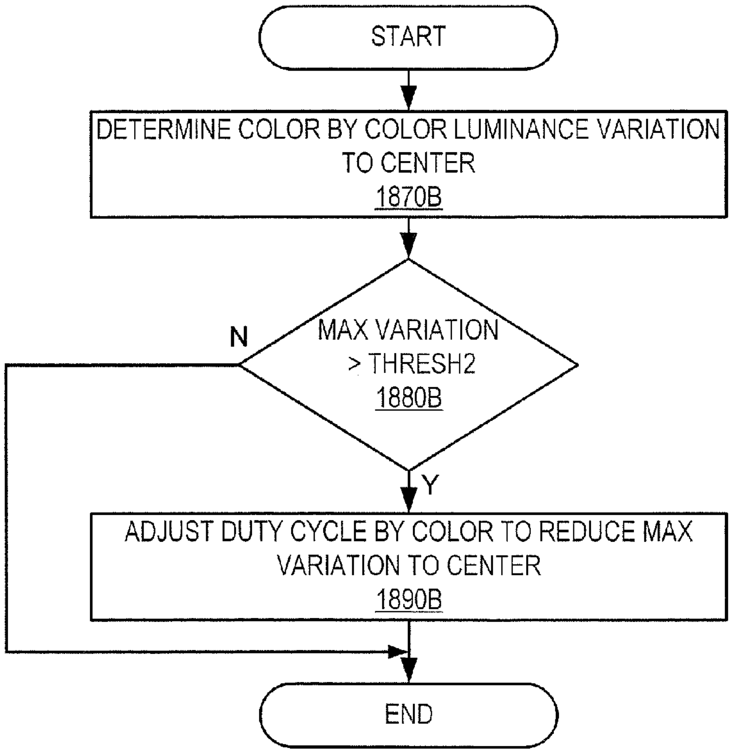

In some embodiments of the present invention illustrated in FIG. 18B, in adjusting the luminance variation to the center luminance, a maximum duty cycle for each color is determined, and the duty cycles of the bars/colors are normalized to the maximum duty cycle for each respective color. That is, the duty cycles of the red strings are normalized to the maximum duty cycle of red strings, the duty cycles of the blue strings are normalized to the maximum duty cycle of blue strings, etc.

Referring now to FIG. 18B, the luminance variation to center points of the display is determined (block 1870B). First, the luminance after color balance (duty cycle adjustment) for each bar/color/measurement point is calculated as follows:

$$Y_{Rmn}'=DC_{Rm}*Y_{Rmn} \quad (20a)$$

$$Y_{Gmn}'=DC_{Gm}*Y_{Gmn} \quad (20b)$$

$$Y_{Bmn}'=DC_{Bm}*Y_{Bmn} \quad (20c)$$

The RGB mixed luminance is then calculated for each position as follows:

$$Y_{mn}'=Y_{Rmn}'+Y_{Gmn}'+Y_{Bmn}' \quad (21)$$

for each of M bars (m 0 [1 . . . M]) and N measurement positions (n 0 [1 . . . N]).

Assuming M=9 and N=3, a center luminance average may be calculated as follows:

$$Y_{center}=(Y_{52}'+Y_{72}'+Y_{32}')/3 \quad (22)$$

A luminance variation to the center luminance average may then be calculated for each bar/measurement position as follows:

$$\Delta Y_{mn}=[Y_{mn}'-\max(Y_{mn}')]/Y_{center} \quad (23)$$

The maximum variation to the center luminance is then compared in block 1880B to a second threshold THRESH2, which may be, for example, 10%. If the maximum variation to the center luminance exceeds the second threshold THRESH2, then the duty cycles are again adjusted to reduce the maximum variation to the center luminance (block 1890B). First, a uniformity coefficient is calculated for each bar as follows:

$$C_m=[1-\min(\Delta Y_{m1}, \ldots, \Delta Y_{mn})]/1.1 \quad (24)$$

A new duty cycle is then calculated as follows:

$$DC_{Rm}'=C_m*DC_{Rm} \quad (25a)$$

$$DC_{Gm}'=C_m*DC_{Gm} \quad (25b)$$

$$DC_{Bm}'=C_m*DC_{Bm} \quad (25c)$$

The maximum duty cycle of all bars for each color is then determined as follows:

$$DC_{Rmax}=\max(DC_{Rm}') \quad (26a)$$

$$DC_{Gmax}=\max(DC_{Gm}') \quad (26b)$$

$$DC_{Bmax}=\max(DC_{Bm}') \quad (26c)$$

where m 0 [1 . . . M].

The duty cycles may then be re-normalized such that the maximum duty cycle is 100% as follows:

$$DC_{Rm}''=DC_{Rm}'/DC_{Rmax} \quad (27a)$$

$$DC_{Gm}''=DC_{Gm}'/DC_{Gmax} \quad (27b)$$

$$DC_{Bm}''=DC_{Bm}'/DC_{Bmax} \quad (27c)$$

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A calibration system for calibrating a lighting panel comprising a plurality of segments, a respective segment configured to emit a first color of light and a second color of light in response to pulse width modulation control signals having respective duty cycles, the calibration system comprising:

a calibration controller configured to be coupled to the lighting panel; and a calibration unit coupled to the calibration controller and comprising a colorimeter, wherein the calibration unit further comprises an XY positioner connected to the colorimeter and configured to move the colorimeter to a measurement location in two dimensions, wherein the calibration controller is configured to activate the plurality of segments to simultaneously emit the first and second colors of light, wherein the calibration unit is configured to measure a combined light output from the plurality of segments at the measurement location to obtain aggregate emission data, and wherein the calibration controller is configured to determine separate emission data for the first and second colors of light based on the aggregate emission data.

2. The calibration system of claim 1, wherein the calibration controller is configured to derive the separate emission data for the first and second colors of light based on extrapolation of the aggregate emission data and expected emission data for the first and second colors of light.

3. The calibration system of claim 2, wherein the calibration controller is further configured to determine first and second local peak wavelengths in respective wavelength ranges corresponding to each of the first and second colors based on the aggregate emission data, determine starting points for an extrapolation algorithm based on the first and second peak wavelength values, and calculate separate spectral distributions for each of the first and second colors of light using the extrapolation algorithm based on the respective starting points.

4. The calibration system of claim 3, wherein the calibration controller is configured to extrapolate portions of the separate spectral distributions for wavelength ranges between the first and second local peak wavelengths.

5. The calibration system of claim 1, wherein the calibration controller is configured to determine separate luminance and/or chromaticity data for the first and/or second colors of light at the measurement location based on the separate emission data.

6. The calibration system of claim 1, wherein each of the plurality of segments is further configured to emit a third color of light in response to the pulse width modulation control signals, and wherein the calibration controller is configured to activate the plurality of segments to simultaneously emit the first, second, and third colors of light and determine separate emission data for the first, second, and third colors of light based on extrapolation of the aggregate emission data and expected emission data for each of the first, second, and third colors of light.

7. The calibration system of claim 6, wherein the first color of light comprises light in a red wavelength range, wherein the second color of light comprises light in a green wavelength range, and wherein the third color of light comprises light in a blue wavelength range.

8. The calibration system of claim 1, wherein the calibration controller is configured to adjust the duty cycle for emission of at least one of the first and second colors of light for at least one of the plurality of segments to reduce a luminance variation thereof based on the separate emission data.

9. A calibration system for calibrating a lighting panel comprising a plurality of segments, a respective segment configured to emit a first color of light and a second color of light in response to pulse width modulation control signals having respective duty cycles, the calibration system comprising:

a calibration controller configured to be coupled to the lighting panel; and a calibration unit coupled to the calibration controller, wherein the calibration unit comprises:

a colorimeter;

an enclosure having an entrance;

a conveyor extending from outside the enclosure to inside the enclosure through the entrance; and a pallet on the conveyor and configured to hold the lighting panel during calibration;

wherein the conveyor and the pallet are configured to bring the lighting panel into enclosure, and wherein the colorimeter is positioned within the enclosure so as to detect a combined light output emitted from the plurality of segments of the lighting panel, wherein the calibration controller is configured to activate the plurality of segments to simultaneously emit the first and second colors of light, wherein the calibration unit is configured to measure the combined light output from the plurality of segments at a measurement location to obtain aggregate emission data, and wherein the calibration controller is configured to determine separate emission data for the first and second colors of light based on the aggregate emission data.

* * * * *

UNITED STATES PATENT AND TRADEMARK OFFICE

CERTIFICATE OF CORRECTION

PATENT NO. : 8,514,210 B2
APPLICATION NO. : 11/751364
DATED : August 20, 2013
INVENTOR(S) : Roberts et al.

It is certified that error appears in the above-identified patent and that said Letters Patent is hereby corrected as shown below:

On Title Page:
Item (75) Inventors: Please correct “Clinton Vllcans, Raleigh, NC (US);”
to read -- Clinton Vilcans, Raleigh, NC (US); --

Signed and Sealed this
Twenty-eighth Day of January, 2014

Michelle K. Lee
*Deputy Director of the United States Patent and Trademark Office*